US011237458B2

United States Patent
Matsumoto et al.

(10) Patent No.: US 11,237,458 B2
(45) Date of Patent: Feb. 1, 2022

(54) FOCUS ADJUSTMENT APPARATUS, IMAGE CAPTURING APPARATUS, FOCUS ADJUSTMENT METHOD, AND STORAGE MEDIUM

(71) Applicant: CANON KABUSHIKI KAISHA, Tokyo (JP)

(72) Inventors: Satoru Matsumoto, Hachioji (JP); Yuichiro Ishitsuka, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 387 days.

(21) Appl. No.: 16/509,572

(22) Filed: Jul. 12, 2019

(65) Prior Publication Data
US 2020/0019040 A1   Jan. 16, 2020

(30) Foreign Application Priority Data
Jul. 13, 2018 (JP) .............................. JP2018-133429

(51) Int. Cl.
*G03B 13/36* (2021.01)
*G02B 7/04* (2021.01)

(52) U.S. Cl.
CPC .............. *G03B 13/36* (2013.01); *G02B 7/04* (2013.01)

(58) Field of Classification Search
CPC ................................. G03B 13/36; G02B 7/04
See application file for complete search history.

(56) References Cited

U.S. PATENT DOCUMENTS

| 7,576,793 | B2 | 8/2009 | Okawara |
| 9,264,602 | B2* | 2/2016 | Shiono .................... G02B 7/10 |
| 2003/0169457 | A1 | 9/2003 | Yasuda |
| 2010/0002127 | A1 | 1/2010 | Ishii |
| 2011/0050982 | A1* | 3/2011 | Katsuyama ............ G02B 7/023 |
| | | | 348/345 |

(Continued)

FOREIGN PATENT DOCUMENTS

| CN | 103595910 A | 2/2014 |
| CN | 107317961 A | 11/2017 |

(Continued)

OTHER PUBLICATIONS

The above patent documents were cited in a European Searh Report dated Dec. 20, 2019, which is enclosed, that issued in the corresponding European Patent Application No. 19184338.2.

(Continued)

*Primary Examiner* — Noam Reisner
(74) *Attorney, Agent, or Firm* — Cowan, Liebowitz & Latman, P.C.

(57) ABSTRACT

There is provided a focus adjustment apparatus. A first obtainment unit obtains a focus degree in a predetermined region of a shooting range. A driving unit drives a focus lens in response to an operation unit being operated. A movement amount of the focus lens per unit of an operation amount of the operation unit during the driving is lower in a case where the focus degree is greater than a focus threshold than in a case where the focus degree is lower than the focus threshold. The focus threshold is higher in a case where the focus lens is moving in a direction that increases the focus degree than in a case where the focus lens is moving in a direction that reduces the focus degree.

12 Claims, 16 Drawing Sheets

(56) References Cited

U.S. PATENT DOCUMENTS

| | | | |
|---|---|---|---|
| 2011/0267706 A1* | 11/2011 | Karasawa | H04N 5/232122 |
| | | | 359/698 |
| 2013/0222926 A1* | 8/2013 | Kawada | G02B 7/04 |
| | | | 359/696 |
| 2016/0116824 A1 | 4/2016 | Okawa | |
| 2016/0291287 A1 | 10/2016 | Kishida et al. | |
| 2018/0129014 A1* | 5/2018 | Okawa | G03B 3/10 |
| 2020/0379317 A1* | 12/2020 | Aoki | H04N 5/36961 |

FOREIGN PATENT DOCUMENTS

| | | |
|---|---|---|
| JP | 2010-226372 A | 10/2010 |
| JP | 2011-215383 A | 10/2011 |

OTHER PUBLICATIONS

The above documents were cited in a Sep. 14, 2020 Chinese Office Action, which is enclosed with an English Translation, that issued in Chinese Patent Application No. 201910602154.0.

\* cited by examiner

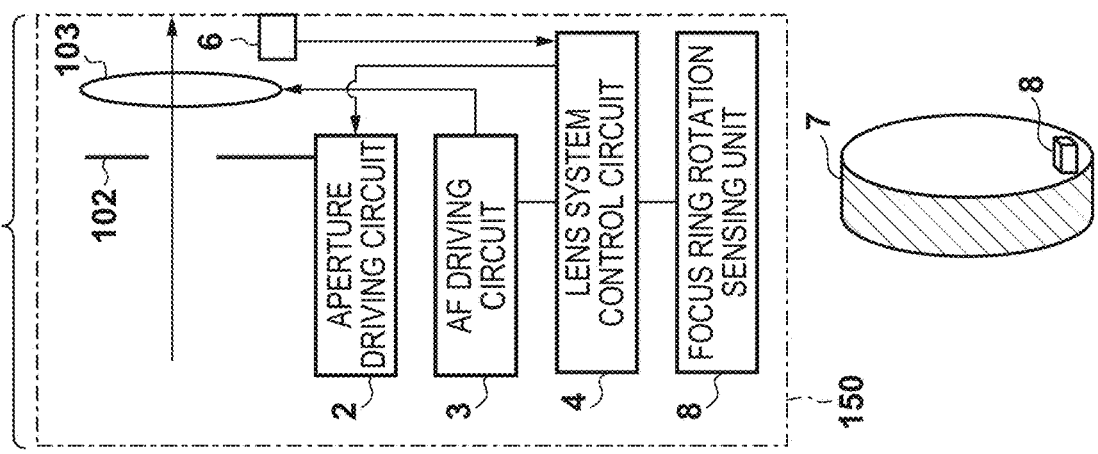
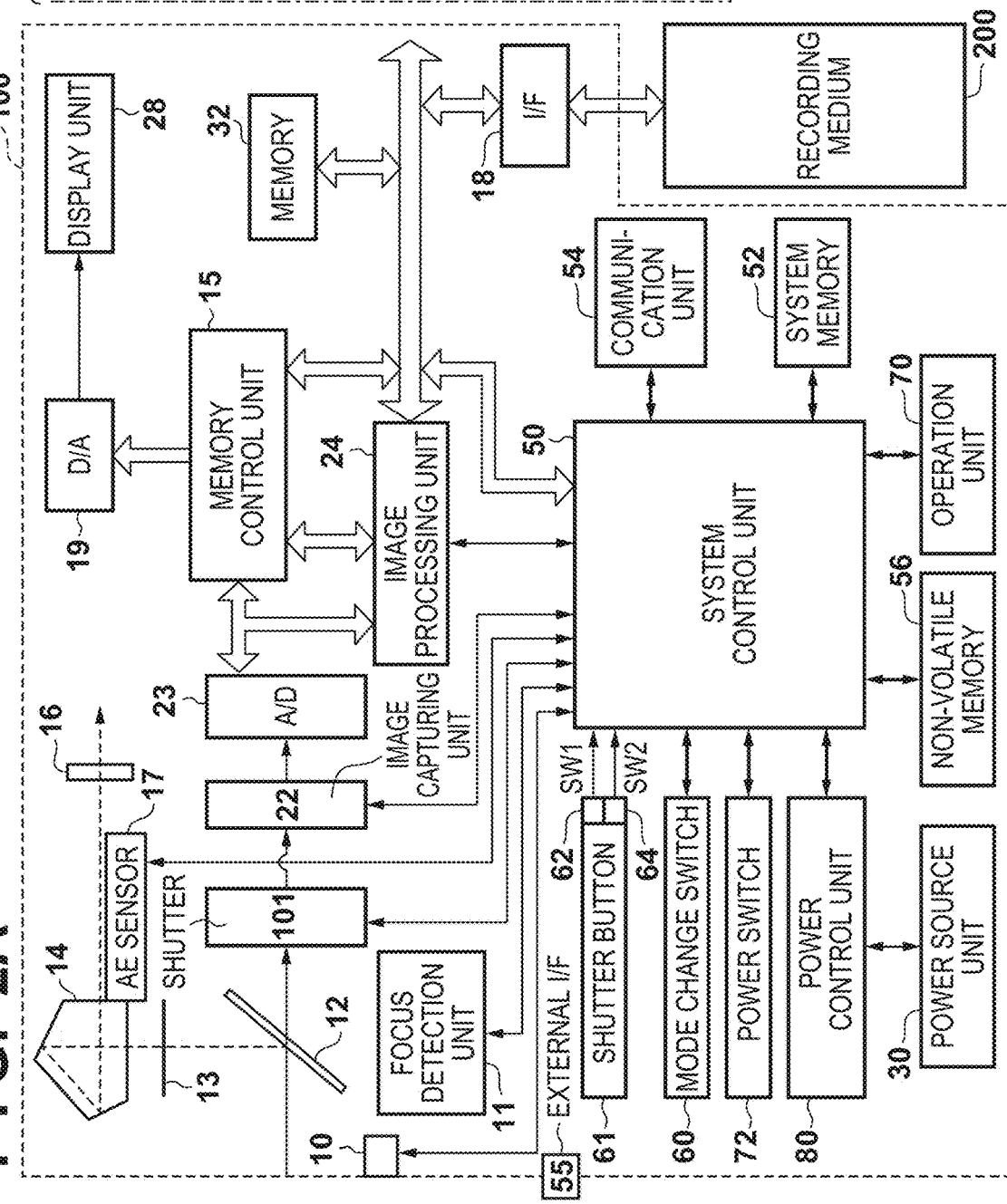

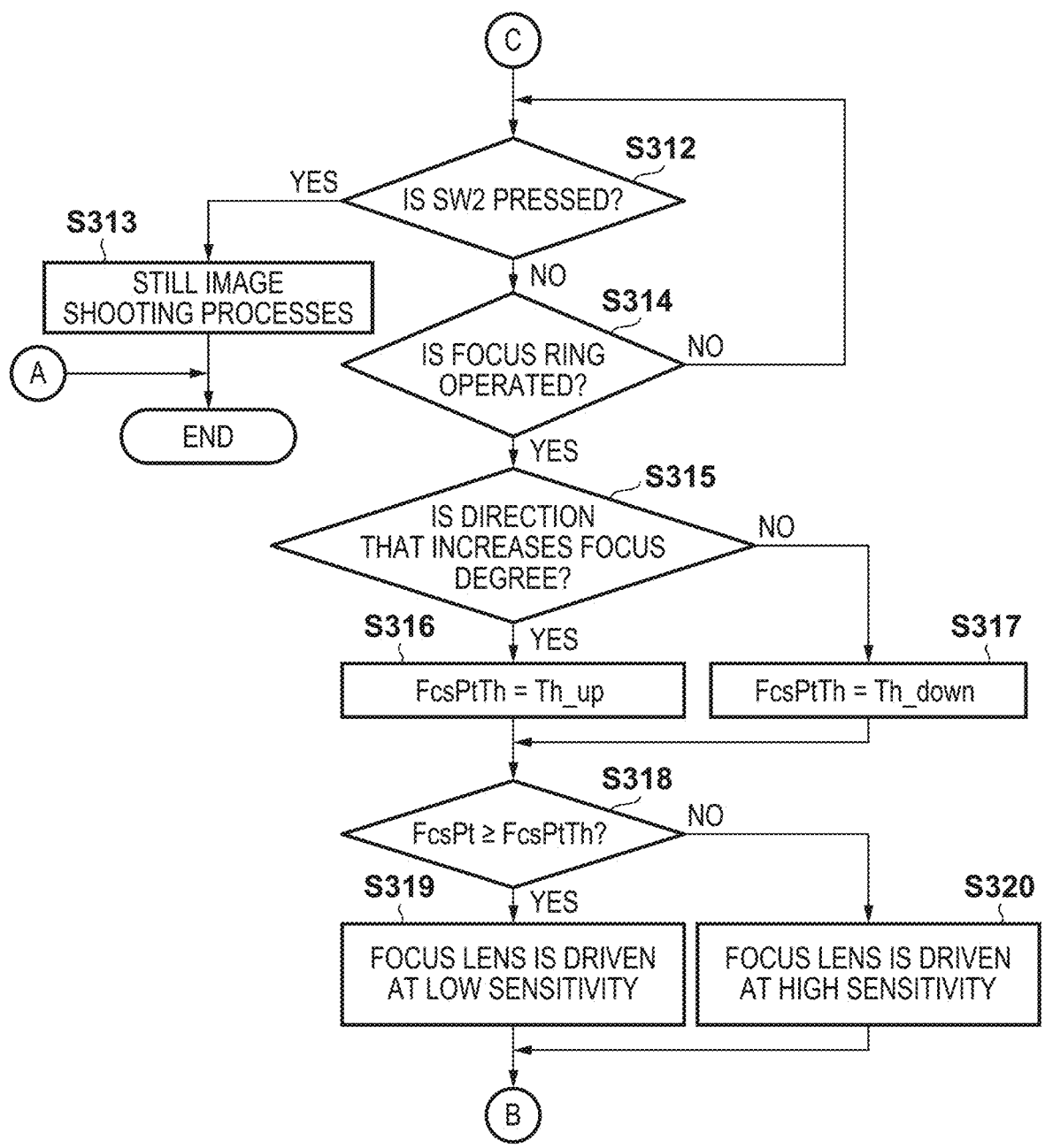

FIG. 7
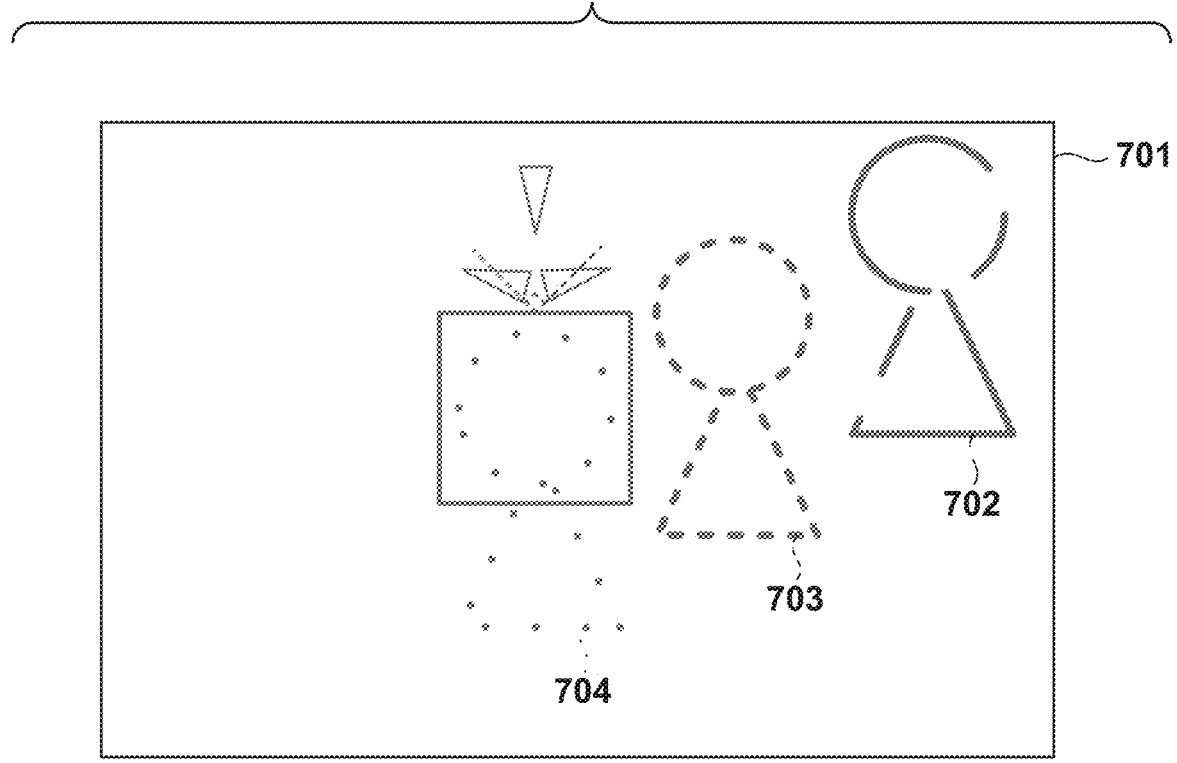
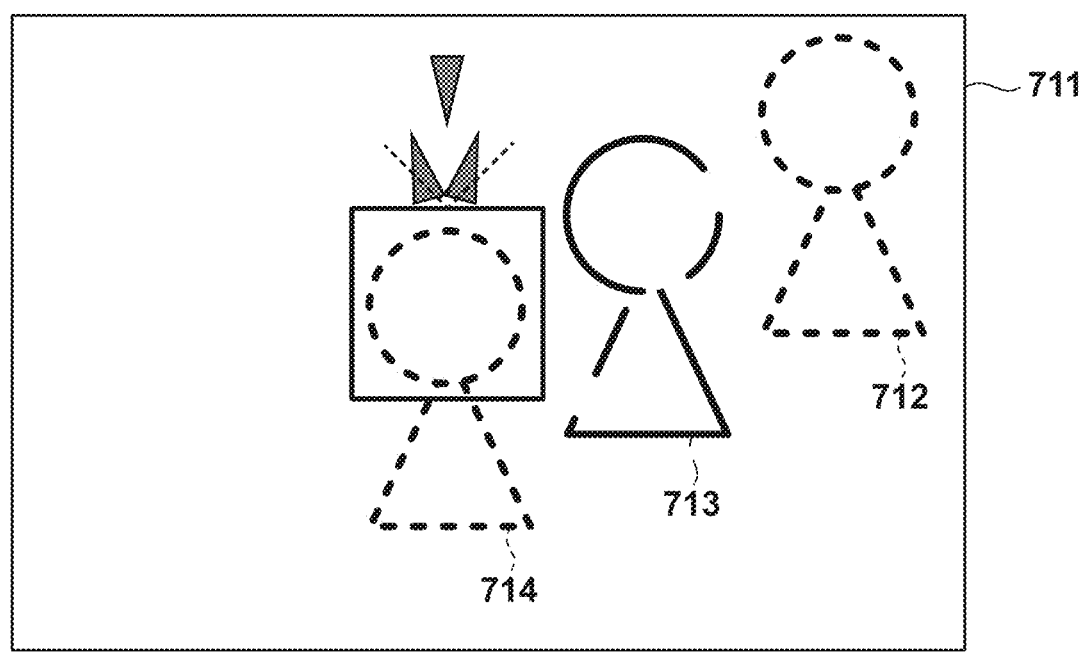

FIG. 8
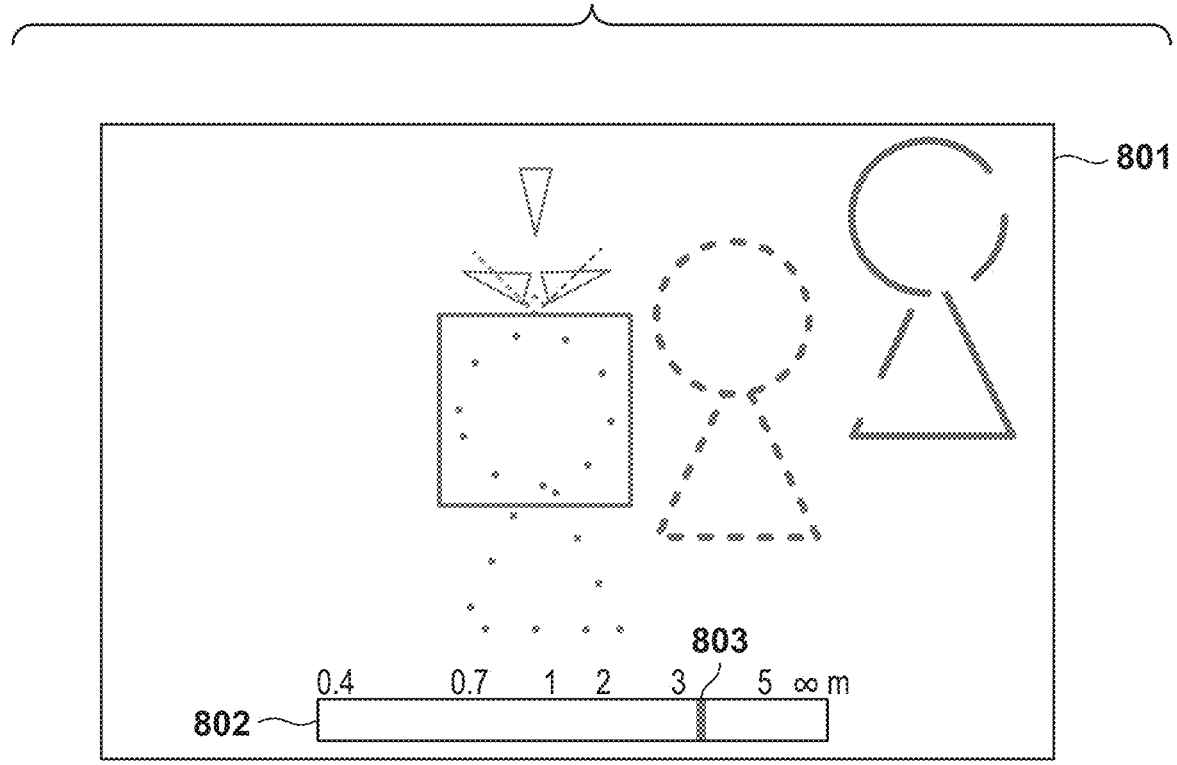
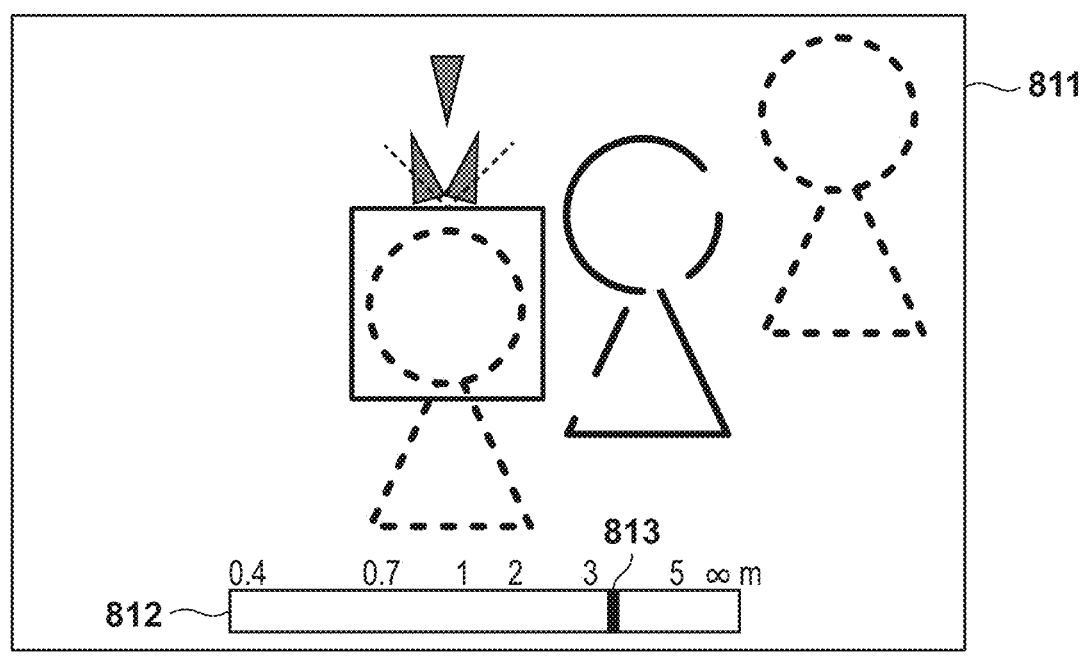

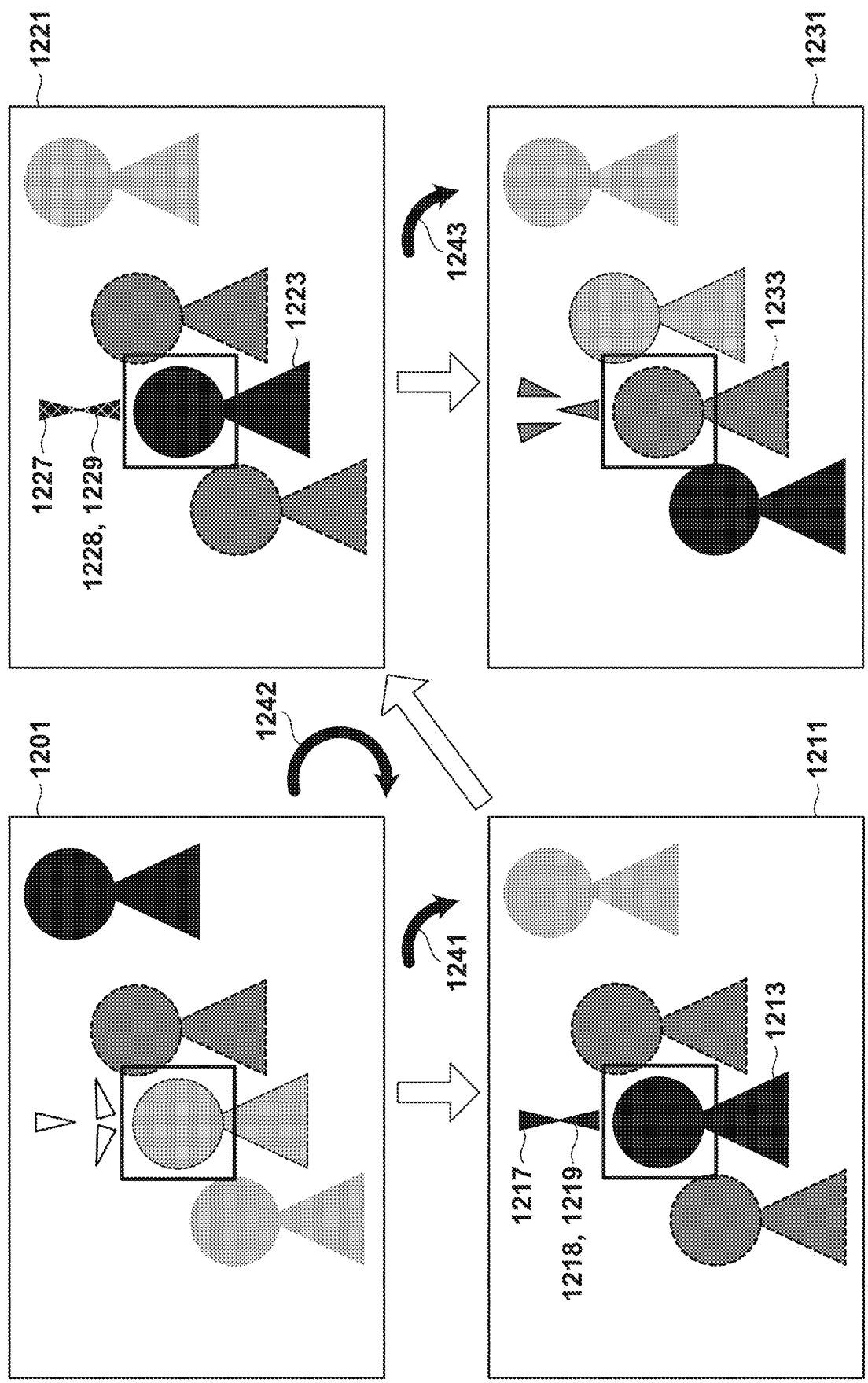

FOCUS ADJUSTMENT APPARATUS, IMAGE CAPTURING APPARATUS, FOCUS ADJUSTMENT METHOD, AND STORAGE MEDIUM

BACKGROUND OF THE INVENTION

Field of the Invention

The present invention relates to a focus adjustment apparatus, an image capturing apparatus, a focus adjustment method, and a storage medium.

Description of the Related Art

The digital camera proposed in Japanese Patent Laid-Open No. 2011-215383 varies the sensitivity of manual focus operations (a focus lens driving amount relative to a user operation amount) in accordance with the state of focus. As disclosed in Japanese Patent Laid-Open No. 2011-215383, the sensitivity of the focus operation is increased when an image is more out of focus and reduced when an image is more in focus, which makes it possible to improve the ease of focus operations when focusing manually.

However, it would be beneficial to users if focus operations could be made even easier when focusing manually.

SUMMARY OF THE INVENTION

Having been achieved in light of such circumstances, the present invention provides a technique for making focus operations even easier when focusing manually.

According to a first aspect of the present invention, there is provided a focus adjustment apparatus comprising: a first obtainment unit configured to obtain a focus degree in a predetermined region of a shooting range; and a driving unit configured to drive a focus lens in response to an operation unit being operated, wherein a movement amount of the focus lens per unit of an operation amount of the operation unit during the driving is lower in a case where the focus degree is greater than a focus threshold than in a case where the focus degree is lower than the focus threshold; and the focus threshold is higher in a case where the focus lens is moving in a direction that increases the focus degree than in a case where the focus lens is moving in a direction that reduces the focus degree.

According to a second aspect of the present invention, there is provided a focus adjustment apparatus comprising: an obtainment unit configured to obtain a focus degree in a predetermined region of a shooting range; and a driving unit configured to drive a focus lens in response to an operation unit being operated, wherein a movement amount of the focus lens per unit of an operation amount of the operation unit during the driving is lower in a case where the focus degree is greater than a focus threshold than in a case where the focus degree is lower than the focus threshold; and in a case where an operation speed of the operation unit is higher than a speed threshold, the movement amount of the focus lens per unit of the operation amount of the operation unit during the driving is higher than in a case where the operation speed is lower than the speed threshold and the focus degree is higher than the focus threshold, regardless of the focus degree.

According to a third aspect of the present invention, there is provided a focus adjustment apparatus comprising: an obtainment unit configured to obtain a focus degree in a predetermined region of a shooting range; and a driving unit configured to drive a focus lens in a first direction in response to a first operation being made in an operation unit, wherein in a case where the focus degree has become a target focus degree while the first operation is underway, the driving unit stops driving the focus lens in the first direction, and in a case where the first operation is suspended and then resumed after the driving has been stopped, the driving unit resumes driving the focus lens in the first direction.

According to a fourth aspect of the present invention, there is provided an image capturing apparatus comprising: the focus adjustment apparatus according to the first aspect; and an image capturing unit.

According to a fifth aspect of the present invention, there is provided a focus adjustment method comprising: obtaining a focus degree in a predetermined region of a shooting range; and driving a focus lens in response to an operation unit being operated, wherein a movement amount of the focus lens per unit of an operation amount of the operation unit during the driving is lower in a case where the focus degree is greater than a focus threshold than in a case where the focus degree is lower than the focus threshold; and the focus threshold is higher in a case where the focus lens is moving in a direction that increases the focus degree than in a case where the focus lens is moving in a direction that reduces the focus degree.

According to a sixth aspect of the present invention, there is provided a focus adjustment method comprising: obtaining a focus degree in a predetermined region of a shooting range; and driving a focus lens in response to an operation unit being operated, wherein a movement amount of the focus lens per unit of an operation amount of the operation unit during the driving is lower in a case where the focus degree is greater than a focus threshold than in a case where the focus degree is lower than the focus threshold; and in a case where an operation speed of the operation unit is higher than a speed threshold, the movement amount of the focus lens per unit of the operation amount of the operation unit during the driving is higher than in a case where the operation speed is lower than the speed threshold and the focus degree is higher than the focus threshold, regardless of the focus degree.

According to a seventh aspect of the present invention, there is provided a focus adjustment method comprising: obtaining a focus degree in a predetermined region of a shooting range; and driving a focus lens in a first direction in response to a first operation being made in an operation unit, wherein in a case where the focus degree has become a target focus degree while the first operation is underway, the driving of the focus lens in the first direction is stopped, and in a case where the first operation is suspended and then resumed after the driving has been stopped, the driving of the focus lens in the first direction is resumed.

According to an eighth aspect of the present invention, there is provided a non-transitory computer-readable storage medium which stores a program for causing a computer to execute a focus adjustment method comprising: obtaining a focus degree in a predetermined region of a shooting range; and driving a focus lens in response to an operation unit being operated, wherein a movement amount of the focus lens per unit of an operation amount of the operation unit during the driving is lower in a case where the focus degree is greater than a focus threshold than in a case where the focus degree is lower than the focus threshold; and the focus threshold is higher in a case where the focus lens is moving in a direction that increases the focus degree than in a case where the focus lens is moving in a direction that reduces the focus degree.

According to a ninth aspect of the present invention, there is provided a non-transitory computer-readable storage medium which stores a program for causing a computer to execute a focus adjustment method comprising: obtaining a focus degree in a predetermined region of a shooting range; and driving a focus lens in response to an operation unit being operated, wherein a movement amount of the focus lens per unit of an operation amount of the operation unit during the driving is lower in a case where the focus degree is greater than a focus threshold than in a case where the focus degree is lower than the focus threshold; and in a case where an operation speed of the operation unit is higher than a speed threshold, the movement amount of the focus lens per unit of the operation amount of the operation unit during the driving is higher than in a case where the operation speed is lower than the speed threshold and the focus degree is higher than the focus threshold, regardless of the focus degree.

According to a tenth aspect of the present invention, there is provided a non-transitory computer-readable storage medium which stores a program for causing a computer to execute a focus adjustment method comprising: obtaining a focus degree in a predetermined region of a shooting range; and driving a focus lens in a first direction in response to a first operation being made in an operation unit, wherein in a case where the focus degree has become a target focus degree while the first operation is underway, the driving of the focus lens in the first direction is stopped, and in a case where the first operation is suspended and then resumed after the driving has been stopped, the driving of the focus lens in the first direction is resumed.

Further features of the present invention will become apparent from the following description of exemplary embodiments with reference to the attached drawings.

BRIEF DESCRIPTION OF THE DRAWINGS

FIG. 2A is a diagram illustrating the internal configuration of the digital camera 100.

FIG. 2B is a diagram illustrating a lens unit 150 that can be connected to the digital camera 100, and a focus ring 7.

FIGS. 3A and 3B are flowcharts illustrating a shooting process according to a first embodiment.

FIG. 7 is a diagram illustrating a configuration for changing the color of MF peaking in accordance with a focus operation sensitivity.

FIG. 8 is a diagram illustrating a configuration for changing the color of a shooting distance information display, indicating the distance from an image capturing unit 22 to an object, in accordance with the focus operation sensitivity.

FIG. 12 is a diagram pertaining to a process for invalidating operations of the focus ring 7 in accordance with a focus degree of a selected object, and the display of a focus guide icon at that time, when focusing manually.

DESCRIPTION OF THE EMBODIMENTS

Figure 1A:
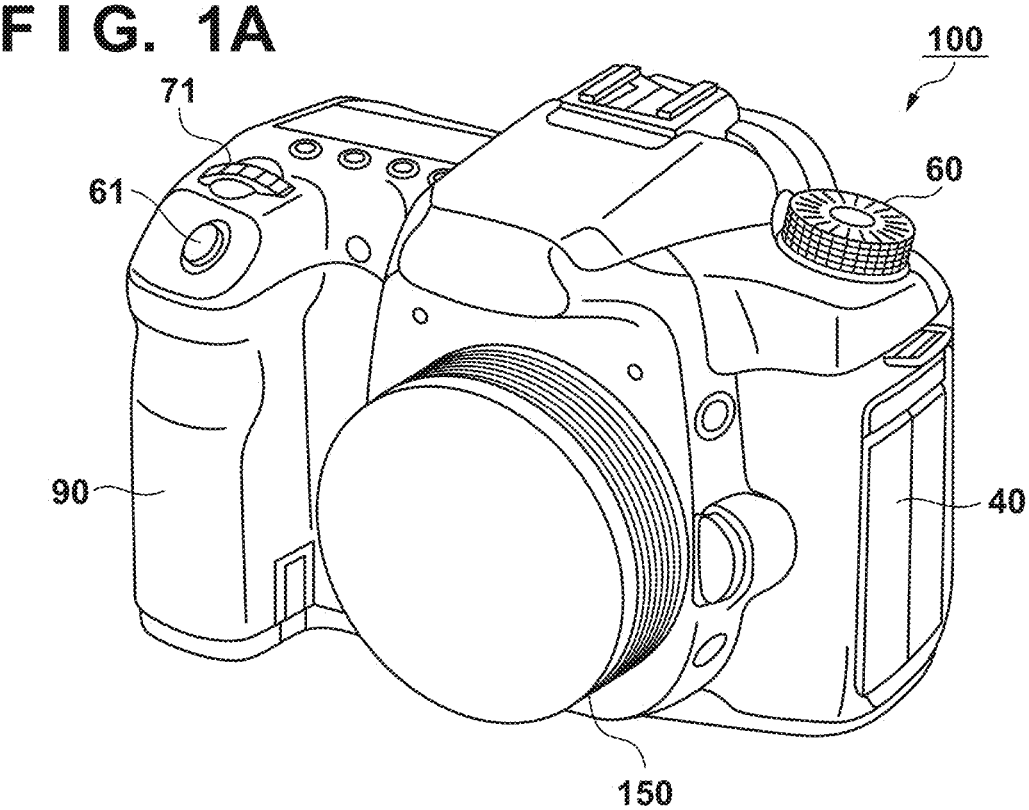
FIG. 1A is a front perspective view of a digital camera 100.

Hereinafter, embodiments of the present invention will be described with reference to the attached drawings. Elements that are given the same reference numerals throughout all of the attached drawings represent the same or similar elements. Note that the technical scope of the present invention is defined by the claims, and is not limited by the following respective embodiments. Also, not all of the combinations of the aspects that are described in the embodiments are necessarily essential to the present invention. Also, the aspects that are described in the individual embodiments can be combined as appropriate.

First Embodiment

Figure 1B:
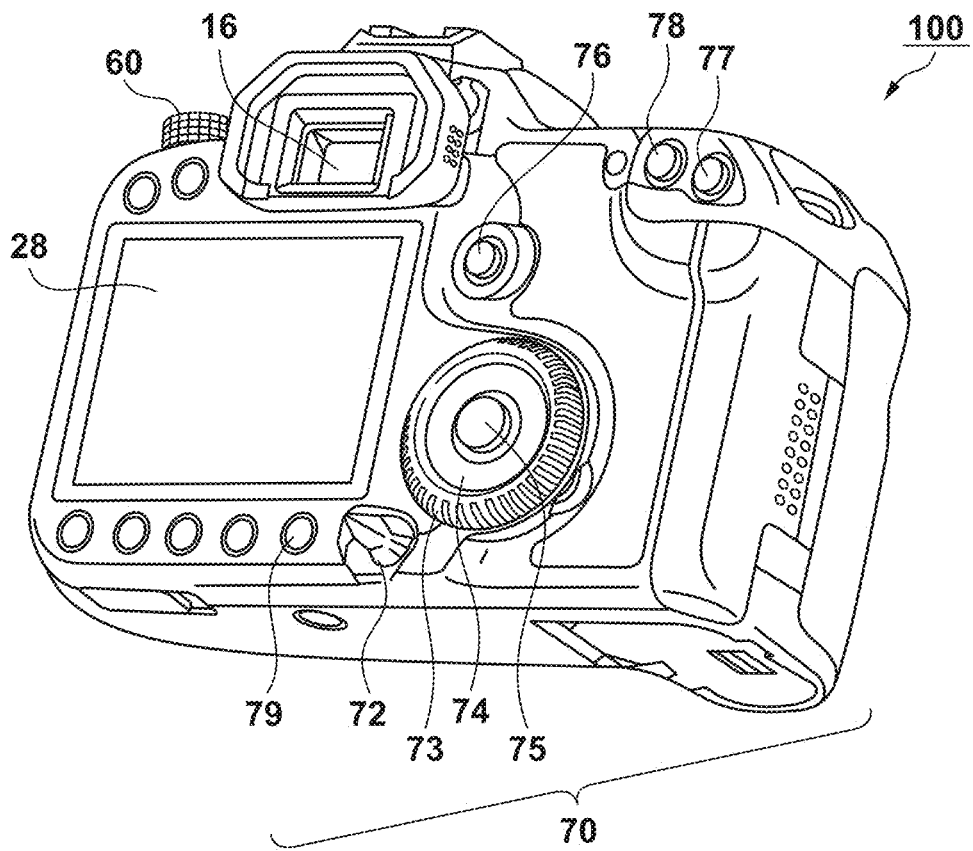
FIG. 1B is a rear perspective view of the digital camera 100.

FIGS. 1A and 1B illustrate the external appearance of a digital camera 100 embodying an image capturing apparatus in which a focus adjustment apparatus according to a first embodiment can be applied. FIG. 1A is a front perspective view of the digital camera 100, and FIG. 1B is a rear perspective view of the digital camera 100. In FIGS. 1A and 1B, a display unit 28 is a display unit that displays images, various types of information, and the like. A shutter button 61 is an operation unit for making a shooting instruction. A mode change switch 60 is an operation unit for switching among various types of modes. A terminal cover 40 is a cover for protecting a connector (not shown) for connecting a connection cable to the digital camera 100 for connecting the digital camera 100 to an external device. A main electronic dial 71 is a rotating operation member, and setting values such as the shutter speed and aperture can be changed or the like by rotating the main electronic dial 71. A power switch 72 is an operation member that switches the power of the digital camera 100 on and off. A sub electronic dial 73 is a rotating operation member for moving a selection frame, cycling through images, and the like. A directional key 74 is a four-direction key having up, down, left, and right parts that can be depressed. An operation based on the part of the directional key 74 that has been pressed can be made. A set button 75 is a pushbutton used mainly to set selected items. An LV button 76 is a button that switches a live view ("LV" hereinafter) on and off. In a moving image shooting mode, the LV button 76 is used to instruct moving image shooting (recording) to start and stop. An enlarge button 77 is an operation button for turning an enlarged mode on and off during a live view display in the shooting mode, and for changing the magnification during the enlarged mode. In a playback mode, the enlarge button 77 functions as an enlarging button for enlarging the displayed image and increasing the magnification. A reduce button 78 is a button for reducing the magnification of a display image that has been enlarged, and reducing the displayed image. A playback button 79 is an operation button that switches between the shooting mode and the playback mode. Pressing the playback button 79 during the shooting mode causes a transition to the playback mode, and the newest image among images recorded in a recording medium 200 (described later with reference to FIG. 2A) can be displayed in the display unit 28. The shutter button 61, the main electronic dial 71, the power switch 72, the sub electronic dial 73, the directional key 74, the set button 75, the LV button 76, and the playback button 79 are included in an operation unit 70. A viewfinder 16 is a look-through type of viewfinder through which a user confirms the focus, composition, and the like of an optical image of an object obtained through a lens unit 150, by observing a focusing screen 13 (described later with reference to FIG. 2A). A grip part 90 is a holding part having a shape that the user can easily grip with his/her right hand while holding the digital camera 100.

FIGS. 2A and 2B are block diagrams illustrating an example of the configuration of the digital camera 100 according to the present embodiment. In FIG. 2B, the lens unit 150 is an interchangeable lens unit including a shooting lens.

A communication terminal 10 is a communication terminal through which the digital camera 100 communicates with the lens unit 150. An AE sensor 17 measures the brightness of the image of an object formed on the focusing screen 13 through the lens unit 150 and a quick-return mirror 12.

A focus detection unit 11 (AF sensor) is a phase detection-type AF sensor on which an image incident through the quick-return mirror 12 is formed, and that outputs defocus amount information to a system control unit 50. The system control unit 50 carries out phase detection AF by controlling the lens unit 150 on the basis of the defocus amount information.

The quick-return mirror 12 is flipped up and down by an actuator (not shown) in response to instructions from the system control unit 50 during exposure, live view shooting, and moving image shooting. The quick-return mirror 12 is a mirror that switches a light beam incident through a lens 103 between the viewfinder 16 side and an image capturing unit 22 side. Although the quick-return mirror 12 is normally positioned so as to reflect the light beam toward the viewfinder 16, the quick-return mirror 12 is raised upward and retracted from the light beams so that the light beams are guided to the image capturing unit 22 (mirror up) during shooting, live view display, and the like. Additionally, the quick-return mirror 12 is a half mirror so that some light can pass through a central part thereof, and thus some of the light beams are transmitted so as to enter the focus detection unit 11 for the purpose of focus detection.

By observing the focusing screen 13 through a pentaprism 14 and the viewfinder 16, the user can confirm the state of focus, composition, and so on of the optical image of an object obtained through the lens unit 150.

A shutter 101 is a member for controlling the exposure time of the image capturing unit 22 under the control of the system control unit 50. The image capturing unit 22 is an image sensor constituted by a CCD, a CMOS element, or the like that converts an optical image into an electrical signal. An A/D converter 23 converts analog signals into digital signals. The A/D converter 23 is used to convert analog signals output from the image capturing unit 22 into digital signals.

An image processing unit 24 carries out prescribed pixel interpolation, resizing processing such as reduction, color conversion processing, and the like on data from the A/D converter 23 or data from a memory control unit 15. The image processing unit 24 also performs prescribed computational processing using captured image data, and a system control unit 50 performs exposure control and rangefinding control based on results obtained from these computations. A TTL (through-the-lens) AF (autofocus) process, an AE (automatic exposure) process, and an EF (flash pre-emission) process are realized as a result. The image processing unit 24 also performs predefined computations using the captured image data, performing a TTL AWB (auto white balance) process on the basis of the results thereof.

Data output from the A/D converter 23 is written into memory 32 through the image processing unit 24 and the memory control unit 15, or directly through the memory control unit 15. The memory 32 stores the image data obtained by the image capturing unit 22 and converted into digital data by the A/D converter 23, image data for display in the display unit 28, and the like. The memory 32 is provided with a storage capacity sufficient to store a predetermined number of still images, a predetermined time's worth of moving images and audio, and so on. The memory 32 also functions as image display memory (video memory). A D/A converter 19 converts data for image display, stored in the memory 32, into an analog signal and supplies the analog signal to the display unit 28. Image data for display written into the memory 32 is thus displayed by the display unit 28 via the D/A converter 19 in this manner. The display unit 28 carries out a display in the display device, which is an LCD or the like, based on the analog signal from the D/A converter 19. An electronic viewfinder function is realized by using the D/A converter 19 to convert the digital signals A/D converted by the A/D converter 23 and stored in the memory 32 into analog signals and then sequentially transferring and displaying those signals in the display unit 28. A through-the-lens image display (live view display) can be carried out as a result.

Non-volatile memory 56 is memory that can be electrically erased and recorded to by the system control unit 50, and, for example, EEPROM is used. Operational constants, programs, and so on of the system control unit 50 are stored in the non-volatile memory 56. Here, "programs" refers to programs for executing the various flowcharts according to the present embodiment, which will be described later.

The system control unit 50 includes at least one processor, and controls the digital camera 100 as a whole. The system control unit 50 implements the respective processes according to the present embodiment, described later, by executing programs recorded in the non-volatile memory 56 mentioned above. Operational constants and variables for the system control unit 50, programs read out from the non-volatile memory 56, and so on are loaded into system memory 52. RAM is used for the system memory 52. The system control unit 50 also carries out display control by controlling the memory 32, the D/A converter 19, the display unit 28, and so on.

The mode change switch 60 switches the operating mode of the system control unit 50 among a still image recording mode, a moving image shooting mode, a playback mode, and so on. The still image recording mode includes an auto shooting mode, an auto scene determination mode, a manual mode, an aperture priority mode (Av mode), and a shutter speed priority mode (Tv mode). There are also various types of scene modes, a program AE mode, custom modes, and the like as shooting settings for different shooting scenes. The mode change switch 60 can be used to switch directly to any one of these modes included in a menu screen. Alternatively, the mode switch may be carried out by first switching to the menu screen using the mode change switch 60 and then using another operation member to switch to one of the modes included in the menu screen. Likewise, the moving image shooting mode may include a plurality of modes.

A first shutter switch 62 switches on partway through the operation of the shutter button 61 provided in the digital camera 100, or in other words, when the button is depressed halfway (a shooting preparation instruction), and produces a first shutter switch signal SW1. The system control unit 50 starts operations such as AF (autofocus) processes, AE (automatic exposure) processes, AWB (auto white balance) processes, and EF (flash pre-emission) processes in response to the first shutter switch signal SW1.

A second shutter switch 64 turns on when the shutter button 61 is completely operated, or in other words, is fully depressed (a shooting instruction), and produces a second shutter switch signal SW2. The system control unit 50 starts a series of shooting processes, from reading out signals from the image capturing unit 22 to writing image data into the recording medium 200, in response to the second shutter switch signal SW2.

Functions relevant for different situations are assigned to operation members in the operation unit 70, which then act as various types of function buttons, by making an operation for selecting various types of function icons displayed in the display unit 28. An end button, a return button, a next image button, a jump button, a sort button, an attribute change button, and so on are examples of the function buttons. For example, a menu screen in which various types of settings can be made is displayed in the display unit 28 when a menu button is pressed. A user can make various types of settings intuitively using the menu screen displayed in the display unit 28, along with up, down, left, and right four-directional buttons, a set button, and so on. The operation unit 70 includes various types of operation members as input units for accepting operations from the user.

A power control unit 80 is constituted by a battery detection circuit, a DC-DC converter, switch circuits for switching the blocks through which power passes, and so on, and detects whether or not a battery is connected, the type of the battery, the remaining battery power, and so on. The power control unit 80 also controls the DC-DC converter based on the detection results and instructions from the system control unit 50, and supplies a necessary voltage for a necessary period to the various units, including the recording medium 200.

A power source unit 30 is a primary battery such as an alkali battery, a lithium battery, or the like, a secondary battery such as a NiCd battery, a NiMH battery, a Li battery, or the like, an AC adapter, and so on. A recording medium I/F 18 is an interface for the recording medium 200, which is a memory card, a hard disk, or the like. The recording medium 200 is a recording medium for recording shot images, such as a memory card or the like, and is constituted by semiconductor memory, a magnetic disk, or the like.

A communication unit 54 is connected to an external device wirelessly or over a hardwire cable, and sends and receives video signals, audio signals, and the like. The communication unit 54 can also connect to a wireless LAN (local area network), the Internet, and so on. The communication unit 54 can transmit images captured by the image capturing unit 22 (including a through-the-lens image), images recorded in the recording medium 200, and the like to the external device, and can also receive image data and various other types of information from the external device.

An external I/F 55 can acquire information pertaining to the type (ID) of a connected lens, whether or not an adapter is connected, and the like. Note that the external OF 55 can connect the lens directly, or can connect the lens via an adapter.

FIG. 2B is a diagram illustrating the lens unit 150 that can be connected to the digital camera 100, and a focus ring 7. The focus ring 7 is disposed so as to follow the outer circumference of the lens unit 150. The focus ring 7 is a rotating member capable of rotating along the circumference of the lens barrel.

FIG. 2B illustrates a fixed focal lens as an example of the lens unit 150. Fixed focal lenses include wide-angle lenses, standard lenses, and telephoto lenses. The lens 103 is normally constituted by a plurality of lenses, but only one lens is shown here for the sake of simplicity. A communication terminal 6 is a communication terminal through which the lens unit 150 communicates with the digital camera 100. The lens unit 150 communicates with the system control unit 50 through the communication terminals 6 and 10. A lens system control circuit 4 controls an aperture 102 through an aperture driving circuit 2. The lens system control circuit 4 also adjusts the focus by changing the position of the lens 103 using an AF driving circuit 3. The focus ring 7 is a ring-shaped operation member for adjusting the focus. A focus ring rotation sensing unit 8, which can sense rotation of the focus ring 7, detects whether or not the focus ring 7 has been rotated, the rotation amount, and the like, and the lens 103 is controlled via the lens system control circuit 4.

A process for determining a focus operation sensitivity in accordance with the degree of focus of a selected object and the direction of change in the degree of focus, when focusing manually, will be described next with reference to FIGS. 3A and 3B. The "focus operation sensitivity" is the amount of movement of the focus lens per unit of an operation amount of an operation member through which the user instructs the focus lens to be driven. When the focus operation sensitivity is high (i.e., when the focus lens is driven with a high sensitivity), there is a high amount of movement per unit of the operation amount. When the focus operation sensitivity is low (i.e., when the focus lens is driven with a low sensitivity), there is a low amount of movement per unit of the operation amount. The following descriptions assume that the focus ring 7 is used as an operation member through which the user instructs the focus lens to be driven, and that the rotation amount of the focus ring 7 corresponds to the operation amount of the operation member. However, in the present embodiment, the operation member through which the user instructs the focus lens to be driven, and the operation amount thereof, are not limited to the focus ring 7 and the rotation amount thereof. For example, the main electronic dial 71 and the rotation amount thereof may be used as the operation member through which the user instructs the focus lens to be driven and the operation amount thereof.

Figure 3A:
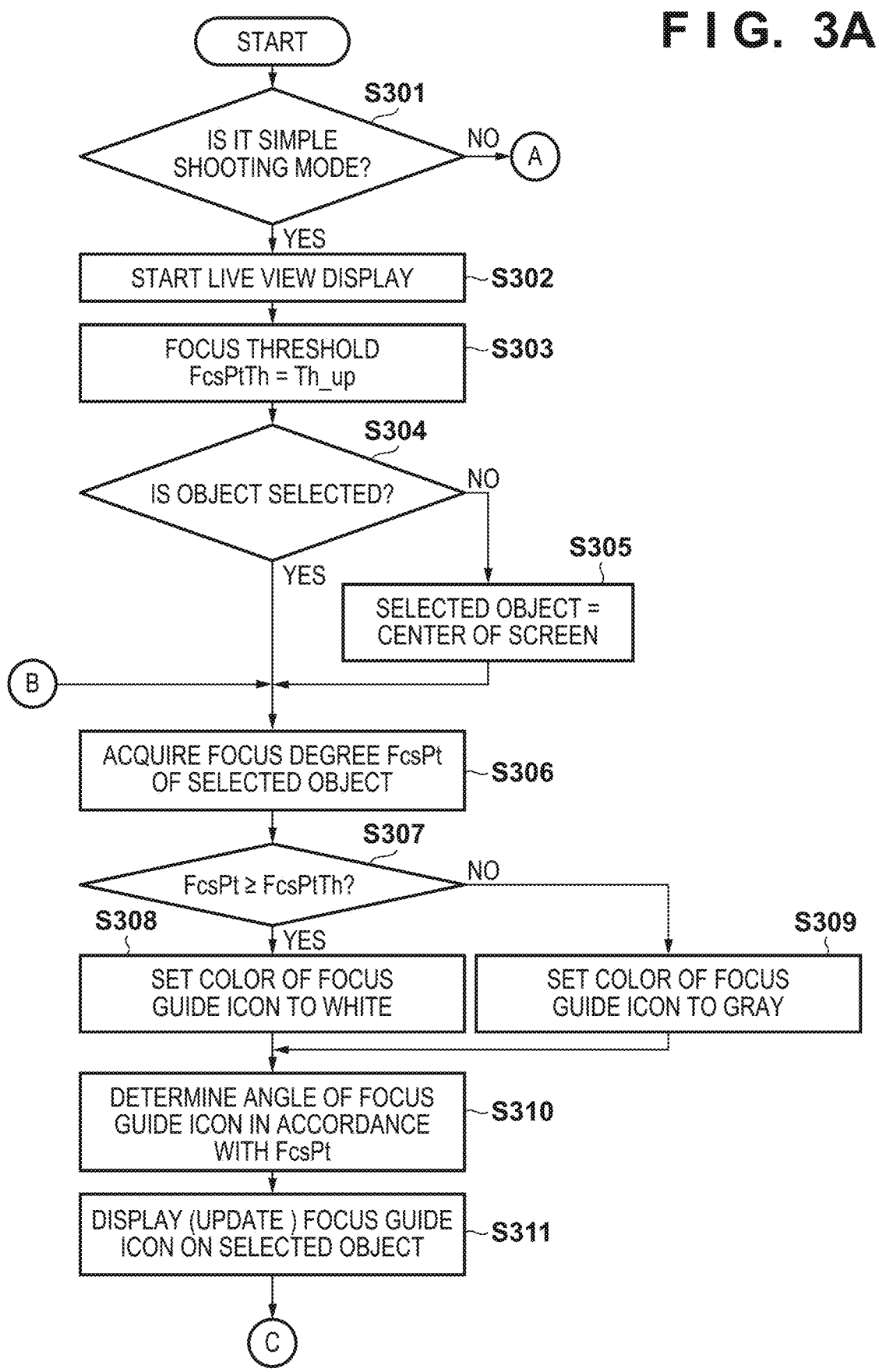

FIGS. 3A and 3B are flowcharts illustrating a shooting process according to the first embodiment. Unless otherwise specified, the processes in each step of these flowcharts are realized by the system control unit 50 executing programs recorded in the non-volatile memory 56 and loaded into the system memory 52.

In step S301, the system control unit 50 determines whether or not the shooting mode is set to a simple shooting mode. The "simple shooting mode" is a shooting mode in which the digital camera 100 automatically determines shooting parameters in accordance with the object. If the shooting mode is set to the simple shooting mode, the process moves to step S302. If not, the processing of this flowchart ends.

In step S302, the system control unit 50 starts a live view display. In step S303, the system control unit 50 sets a focus threshold FcsPtTh, which is a threshold for the degree of focus at which to change the focus operation sensitivity, to Th_up.

In step S304, the system control unit 50 determines whether or not an object (region) to be focused on is selected by the user. If the object is selected, the process moves to step S306. If the object is not selected, the process moves to step S305.

In step S305, the system control unit 50 takes the center of the screen as the selected object.

In step S306, the system control unit 50 acquires a focus degree FcsPt of the selected object. In step S307, the system control unit 50 determines whether or not FcsPt is greater than or equal to FcsPtTh. If FcsPt is greater than or equal to FcsPtTh (i.e., if the focus degree is greater than or equal to the focus threshold), the process moves to step S308. However, if FcsPt is not greater than or equal to FcsPtTh (i.e., if the focus degree is less than the focus threshold), the process moves to step S309.

In step S308, the system control unit 50 sets the color of a focus guide icon (described later) to a color indicating that the focus operation sensitivity is a low sensitivity (white is used here). The system control unit 50 may also set the color of MF peaking (described later) to a color indicating that the focus operation sensitivity is a low sensitivity.

In step S309, the system control unit 50 sets the color of the focus guide icon to a color indicating that the focus operation sensitivity is a high sensitivity (gray is used here). The system control unit 50 may also set the color of MF peaking to a color indicating that the focus operation sensitivity is a high sensitivity.

In step S310, the system control unit 50 determines a display angle of the focus guide icon (described later) in accordance with the value of FcsPt.

In step S311, the system control unit 50 displays the focus guide icon superimposed on the selected object. The display color of the focus guide icon is the color set in step S308 or step S309, in the display angle of the focus guide icon is the angle determined in step S310. If the focus guide icon is already displayed, the display color and the display angle are updated. The display format of the focus guide icon will be described in detail later with reference to FIG. 4.

In step S312, the system control unit 50 determines whether or not the second shutter switch 64 has been pressed (whether or not SW2 has been generated). If SW2 has been generated, the process moves to step S313. If SW2 has not been generated, the process moves to step S314.

In step S313, the system control unit 50 executes a series of still image shooting processes, from reading out signals from the image capturing unit 22 to writing image data into the recording medium 200. The processing of this flowchart then ends.

In step S314, the system control unit 50 determines whether or not the focus ring 7 has been operated (i.e., whether or not the focus ring 7 has been rotated). If the focus ring 7 has been operated, the process moves to step S315. If the focus ring 7 has not been operated, the process returns to step S312.

In step S315, the system control unit 50 determines whether or not the direction in which the focus ring 7 was operated has increased the focus degree (i.e., whether or not the focus lens is moving in a direction that increases the focus degree). If the direction increases the focus degree, the process moves to step S316, whereas if the direction reduces the focus degree, the process moves to step S317.

In step S316, the system control unit 50 sets the focus threshold FcsPtTh to Th_up. On the other hand, in step S317, the system control unit 50 sets the focus threshold FcsPtTh to Th_down. Th_up is higher than Th_down. In other words, the focus threshold is higher when the focus lens is moving in a direction that increases the focus degree than when the focus lens is moving in a direction that reduces the focus degree.

In step S318, the system control unit 50 determines whether or not FcsPt is greater than or equal to FcsPtTh. If FcsPt is greater than or equal to FcsPtTh (i.e., if the focus degree is greater than or equal to the focus threshold), the process moves to step S319. However, if FcsPt is not greater than or equal to FcsPtTh (i.e., if the focus degree is less than the focus threshold), the process moves to step S320.

In step S319, the system control unit 50 sets the focus operation sensitivity to the low sensitivity, and drives the focus lens at the low sensitivity. On the other hand, in step S320, the system control unit 50 sets the focus operation sensitivity to the high sensitivity, and drives the focus lens at the high sensitivity. Accordingly, the movement amount of the focus lens per unit of the operation amount of the focus ring 7 is lower when the focus degree FcsPt is greater than or equal to the focus threshold FcsPtTh than when the focus degree FcsPt is less than the focus threshold FcsPtTh.

Figure 4:
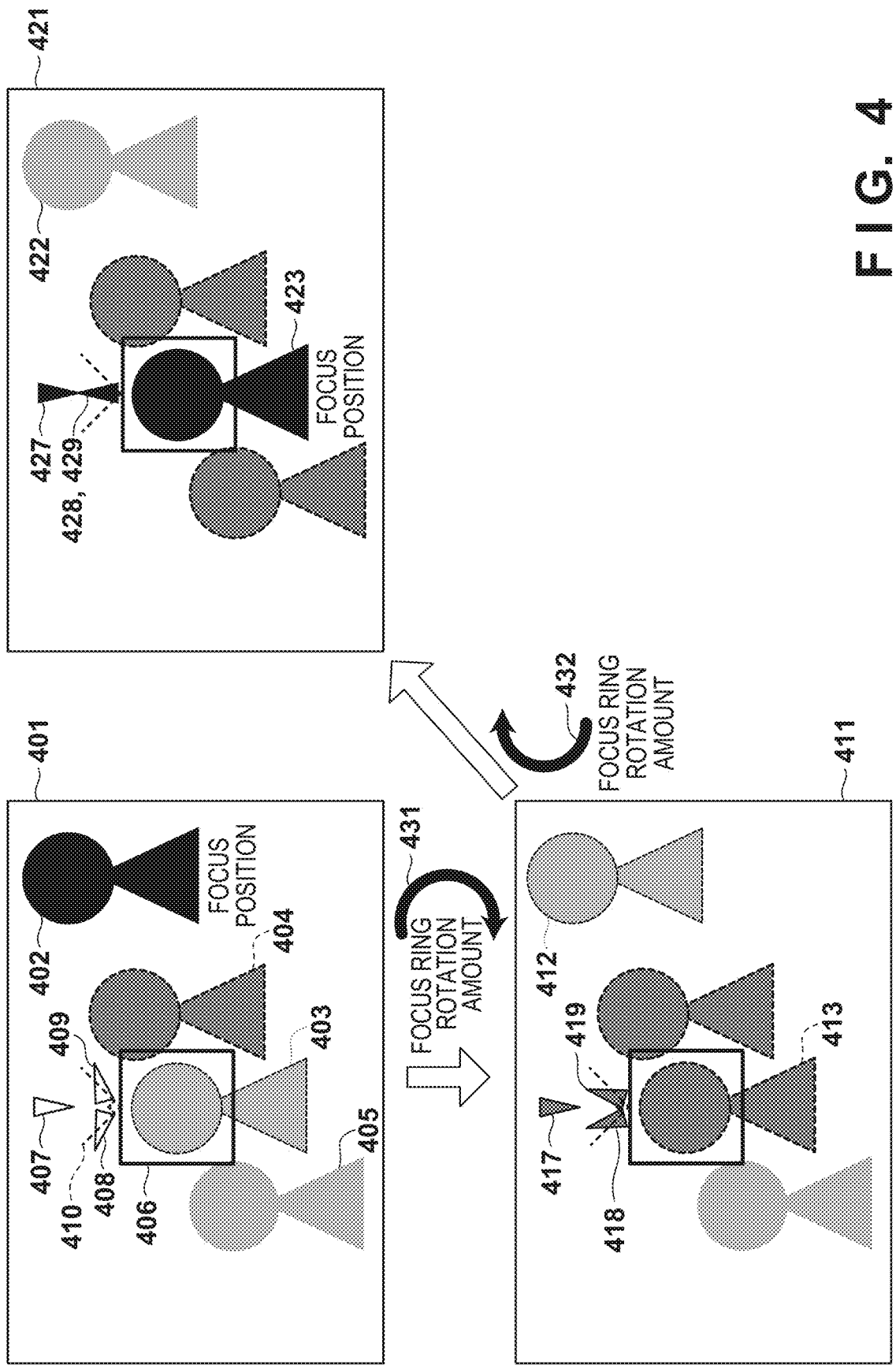
FIG. 4 is a diagram illustrating the display format of a focus guide icon.

FIG. 4 is a diagram illustrating the display format of the focus guide icon. A shooting screen 401 is a screen displayed in the display unit 28 of the digital camera 100, and includes a live view image (a captured image corresponding to the shooting range). The shooting screen 401 corresponds to a state before the focus is adjusted.

An object 402 is an object currently in focus. An object 403 is an object that the user wishes to focus on (i.e., the selected object). An object 404 is an object located between the object 402 and the object 403 as seen along the optical axis of the digital camera 100. An object 405 is an object located closer to the digital camera 100 than the object 403, as seen along the optical axis of the digital camera 100. A selection frame 406 is a frame indicating a region corresponding to the selected object.

Focus guide icons 407, 408, and 409 are images indicating the focus degree of the selected object (the object 403). In other words, in the example illustrated in FIG. 4, the focus guide icons are constituted by three triangles. In the following descriptions, the shortest side of each triangle will be called its "base side". The angle of a corner formed by a straight line passing through the center of the base side of the focus guide icon 408 and the apex of that icon, and a straight line passing through the center of the base side of the focus guide icon 409 in the apex of that icon (a corner on the side of the focus guide icon 407), changes in accordance with the focus degree of the selected object (the object 403). The angle increases as the focus degree decreases. In other words, the focus guide icons 407, 408, and 409 include graphics in which the angles change depending on the focus degree. The focus guide icons 407, 408, and 409 are also displayed with different colors in accordance with defocus operation sensitivity (i.e., in accordance with whether or not the focus degree is greater than or equal to the focus threshold). Accordingly, the focus guide icons 407, 408, and 409 indicate the focus operation sensitivity using changing colors.

In the state indicated by the shooting screen 401, the position of the object 402 is in focus, and the focus guide icons 407, 408, and 409 are displayed at angles corresponding to a state in which the focus degree with respect to the object 403 is low. The focus guide icons 407, 408, and 409 are also displayed with a color indicating that the focus operation sensitivity is the high sensitivity (white is used here).

A guideline 410 is an image indicating a point of change of the focus operation sensitivity to the user. If the angle formed by the focus guide icons 408 and 409 is lower than the angle of the guideline 410, the focus operation sensitivity is the high sensitivity, whereas if the angle is greater than the angle of the guideline 410, the focus operation sensitivity is the low sensitivity. In other words, the guideline 410 is an image indicating an angle between the focus guide icons 408 and 409 where the focus degree is equal to the focus threshold.

When the focus ring 7 is rotated as indicated by a focus ring rotation amount 431, the shooting screen 401 changes to a shooting screen 411. The shooting screen 411 corresponds to a state partway through the focus adjustment.

An object 412 corresponds to the object 402, but is not in focus in the state indicated by the shooting screen 411. An object 413 is an object that the user wishes to focus on (i.e., the selected object). As a result of the focus ring 7 being rotated, the focus position is closer to the object 413 than in the state indicated by the shooting screen 401, and thus the focus degree has increased. As a result, focus guide icons 417, 418, and 419 have a lower angle, indicating the focus degree, than the focus guide icons 407, 408, and 409. The focus guide icons 417, 418, and 419 are also displayed with a color indicating that the focus operation sensitivity is the low sensitivity (gray is used here).

When the focus ring 7 is rotated further as indicated by a focus ring rotation amount 432, the shooting screen 411 changes to a shooting screen 421. The shooting screen 421 corresponds to a state in which the focus adjustment has resulted in the focus position matching the position of the selected object.

An object 422 corresponds to the object 402, but is even further out of focus, in the state indicated by the shooting screen 421, than in the state indicated by the shooting screen 411. An object 423 is an object that the user wishes to focus on (i.e., the selected object). As a result of the focus ring 7 being rotated, the focus position matches the object 423, for a maximum focus degree. As such, focus guide icons 427, 428, and 429 have an angle, indicating the focus degree, that is minimum (0 degrees). Furthermore, the focus guide icons 427, 428, and 429 are displayed with a color indicating that the focus operation sensitivity is the low sensitivity and that the focus degree is maximum (black is used here).

A configuration in which the color of the focus guide icons is changed has been described thus far as an example of a configuration in which the display format of the shooting screen is changed in accordance with the focus operation sensitivity (i.e., in accordance with whether or not the focus degree is greater than or equal to the focus threshold). However, another configuration can be employed as well. The following describes, with reference to FIGS. 7 and 8, another example of the configuration in which the display format of the shooting screen is changed.

FIG. 7 is a diagram illustrating a configuration for changing the color of MF peaking in accordance with the focus operation sensitivity. In the example illustrated in FIG. 7, "MF peaking" refers to a process in which edge parts of an object are displayed with emphasis in different ways depending on the amount by which the object is out of focus. However, the MF peaking according to the present embodiment is not limited to the process illustrated in FIG. 7, and may, for example, be a process for displaying the edge parts of an object that is in focus with emphasis.

Shooting screens 701 and 711 are screens displayed in the display unit 28 of the digital camera 100, and include a live view image (a captured image corresponding to the shooting range). The shooting screen 701 indicates a display format of MF peaking when the focus operation sensitivity is the high sensitivity, whereas the shooting screen 711 indicates a display format of MF peaking when the focus operation sensitivity is the low sensitivity. The edge parts of objects 702, 703, and 704 are displayed with emphasis, using a lighter color than the edge parts of objects 712, 713, and 714. In other words, in the example illustrated in FIG. 7, the density of the color indicating MF peaking changes in accordance with the focus operation sensitivity. Note that instead of changing the density of the color of MF peaking, the brightness of the color of MF peaking may be changed.

FIG. 8 is a diagram illustrating a configuration for changing the color of a shooting distance information display, indicating the distance from the image capturing unit 22 to an object, in accordance with the focus operation sensitivity. Shooting screens 801 and 811 are screens displayed in the display unit 28 of the digital camera 100, and include a live view image (a captured image corresponding to the shooting range). The shooting screen 801 indicates a display format of shooting distance information when the focus operation sensitivity is the high sensitivity, whereas the shooting screen 811 indicates a display format of the shooting distance information when the focus operation sensitivity is the low sensitivity.

Shooting distance bars 802 and 812 indicate the distance from the image capturing unit 22 to the object. The distance is displayed above the shooting distance bars 802 and 812. Current position indicators 803 and 813 indicate the current distance from the image capturing unit 22 to the object. The current position indicator 803 is displayed with a lighter color than the current position indicator 813. In other words, in the example illustrated in FIG. 8, the density of the color of the current position indicator changes in accordance with the focus operation sensitivity. Note that instead of changing the density of the color of the current position indicator, the brightness of the color of the current position indicator may be changed.

According to the first embodiment as described thus far, the digital camera 100 drives the focus lens in response to the focus ring 7 being operated. The movement amount of the focus lens per unit of the operation amount of the focus ring 7 during this driving is lower when the focus degree of the selected object is greater than or equal to the focus threshold than when the focus degree is less than the focus threshold (see steps S318 to S320 in FIG. 3B). Additionally, the focus threshold is higher when the focus lens is moving in a direction that increases the focus degree than when the focus lens is moving in a direction that reduces the focus degree (see steps S315 to S317 in FIG. 3B). Thus if, during manual focus, the focus lens has passed the position where the selected object is in focus, it is difficult for the focus operation sensitivity to return from low sensitivity to high-sensitivity, which makes it easier to adjust the focus.

Second Embodiment

A second embodiment will describe a process for determining a focus operation sensitivity in accordance with the degree of focus of a selected object and the rotation speed of the focus ring 7, when focusing manually. In the second embodiment, the basic configuration of the digital camera 100 is the same as in the first embodiment (see FIGS. 1A to 2B). The following will primarily describe areas that are different from the first embodiment.

Figure 5A:
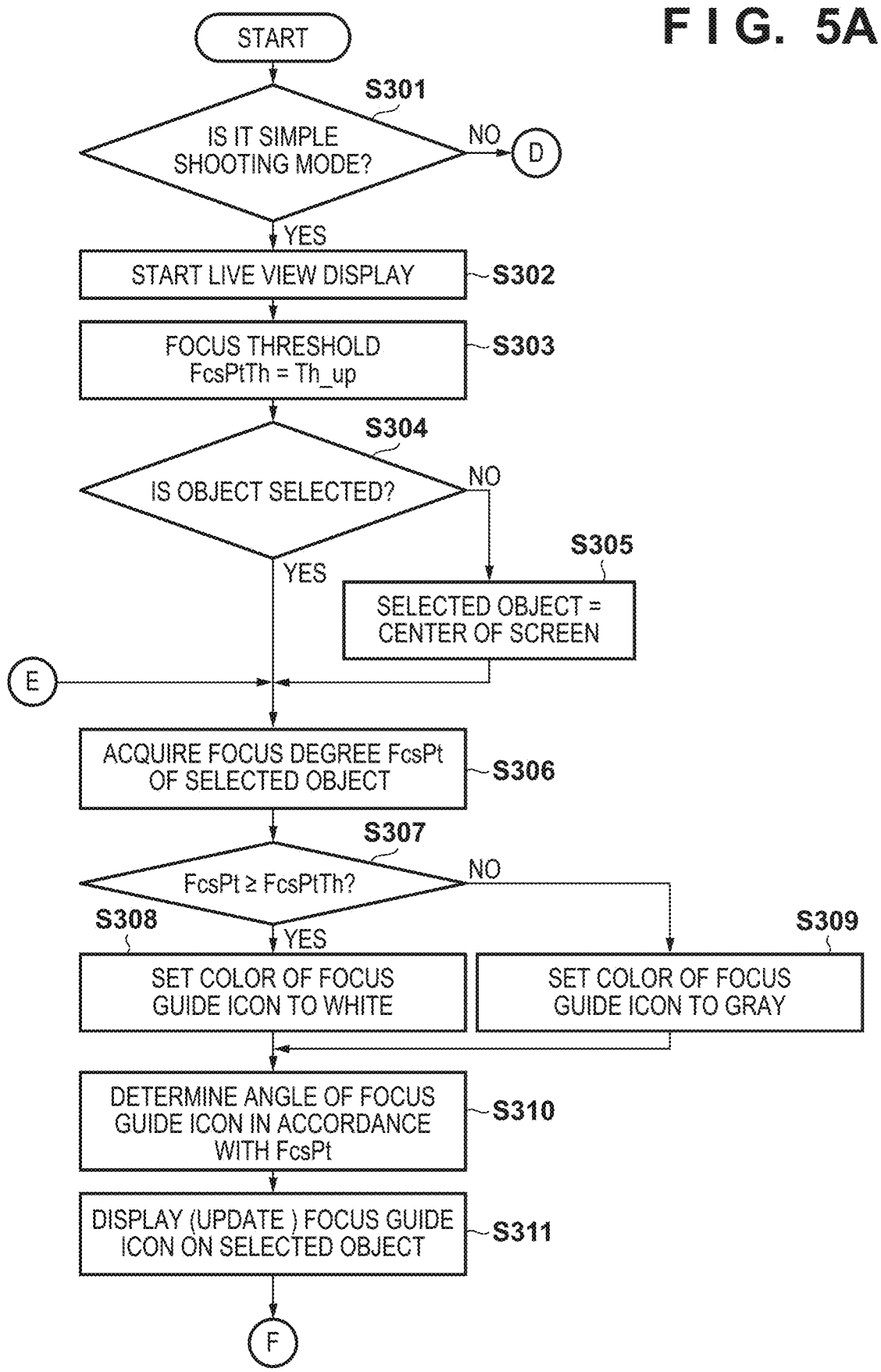
FIGS. 5A and 5B are flowcharts illustrating a shooting process according to a second embodiment.
Figure 5B:
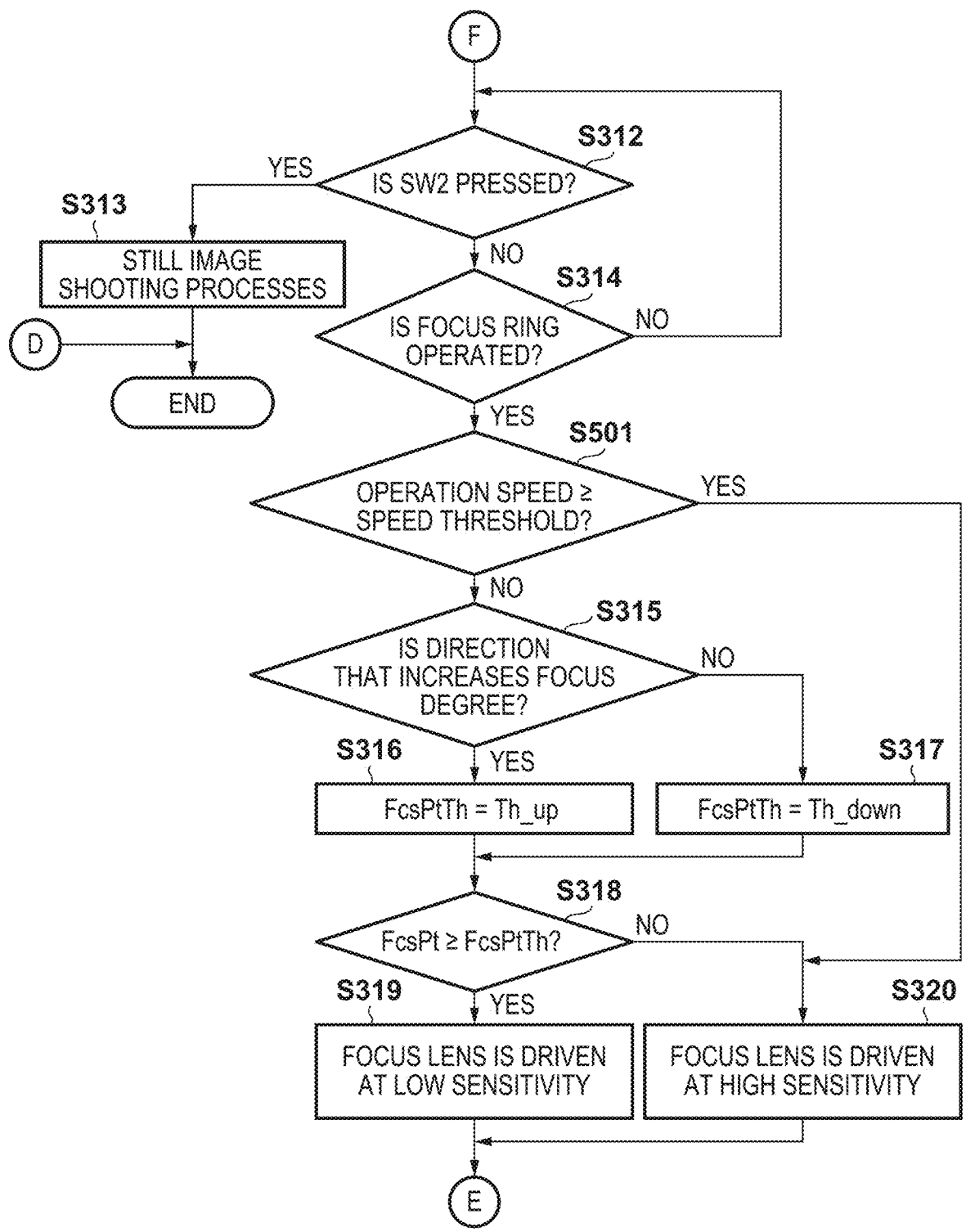

FIGS. 5A and 5B are flowcharts illustrating a shooting process according to the second embodiment. Unless otherwise specified, the processes in each step of these flowcharts are realized by the system control unit 50 executing programs recorded in the non-volatile memory 56 and loaded into the system memory 52.

In step S501, it is determined whether or not an operation speed (rotation speed) of the focus ring 7 is greater than or equal to a speed threshold, which is a threshold pertaining to the speed. If the operation speed is greater than or equal to the speed threshold, the process moves to step S320. Thus when the operation speed is greater than or equal to the speed threshold, the system control unit 50 sets the focus operation sensitivity to the high sensitivity regardless of the focus degree of the selected object. On the other hand, if the operation speed is less than the speed threshold, the process moves to step S315.

In the example illustrated in FIGS. 5A and 5B, the focus operation sensitivity when the operation speed is greater than or equal to the speed threshold is the same as when the operation speed is less than the speed threshold and the focus degree is less than the focus threshold. However, the present embodiment is not limited thereto. The focus operation sensitivity when the operation speed is greater than or equal to the speed threshold may be any sensitivity that is higher than when the operation speed is less than the speed threshold and the focus degree is greater than or equal to the focus threshold. In other words, when the operation speed of the focus ring 7 is greater than or equal to the speed threshold, the movement amount of the focus lens per unit of the operation amount of the focus ring 7 is greater than when the operation speed is less than the speed threshold and the focus degree is greater than or equal to the focus threshold, regardless of the focus degree.

According to the second embodiment as described thus far, the digital camera 100 drives the focus lens in response to the focus ring 7 being operated. The movement amount of the focus lens per unit of the operation amount of the focus ring 7 during this driving is lower when the focus degree of the selected object is greater than or equal to the focus threshold than when the focus degree is less than the focus threshold (see steps S318 to S320 in FIG. 5B). When the operation speed of the focus ring 7 is greater than or equal to the speed threshold, the movement amount of the focus lens per unit of the operation amount of the focus ring 7 during the driving is greater than when the operation speed is less than the speed threshold and the focus degree is greater than or equal to the focus threshold, regardless of the focus degree (see step S501 in FIG. 5B). Thus even if, during manual focus, the focus degree is high, the focus lens can be driven with high sensitivity as necessary, which makes it easier to adjust the focus.

Third Embodiment

The third embodiment will describe a configuration in which, when focusing manually, the user can set a target focus degree for the selected object. In the third embodiment, the basic configuration of the digital camera 100 is the same as in the first embodiment (see FIGS. 1A to 2B). The following will primarily describe areas that are different from the first embodiment.

Figure 6:
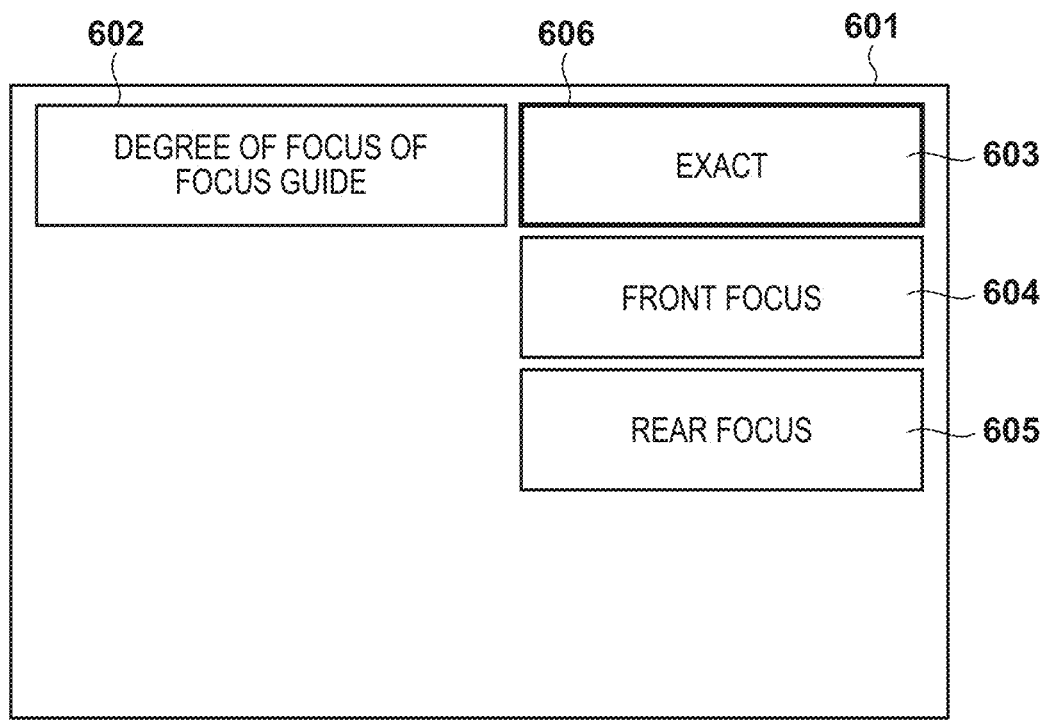
FIG. 6 is a diagram illustrating a target focus degree setting screen 601.

FIG. 6 is a diagram illustrating a target focus degree setting screen 601. By making a predetermined operation in the operation unit 70, for example, the user can cause the setting screen 601 to be displayed in the digital camera 100. A title 602 indicates the title of the setting screen 601.

In the setting screen 601, the user can select exact 603, front focus 604, or rear focus 605 as the target focus degree by using the directional key 74 to move a cursor 606 up and down. The system control unit 50 acquires the target focus degree selected by the user.

In step S310 of FIG. 3A and FIG. 5A, the system control unit 50 determines the angle of the focus guide icons corresponding to the focus degree FcsPt on the basis of the target focus degree. The focus guide icons are displayed at an angle indicating that the selected object is in focus when the focus degree of the selected object is equal to the target focus degree. As such, if, for example, front focus 604 is selected as the target focus degree, the focus guide icons 427, 428, and 429 indicated in FIG. 4 are displayed when the selected object is in a front focus state.

According to the third embodiment as described thus far, the digital camera 100 acquires the target focus degree selected by the user, and when the focus degree of the selected object is equal to the target focus degree, the focus guide icons are displayed at an angle indicating that the selected object is in focus. This makes it easier to adjust the focus when focusing manually.

Fourth Embodiment

The fourth embodiment will describe a configuration in which, when focusing manually, focus operations are invalidated in accordance with the focus degree of the selected object. In the fourth embodiment, the basic configuration of the digital camera 100 is the same as in the first embodiment (see FIGS. 1A to 2B). The following will primarily describe areas that are different from the first embodiment.

Figure 9A:
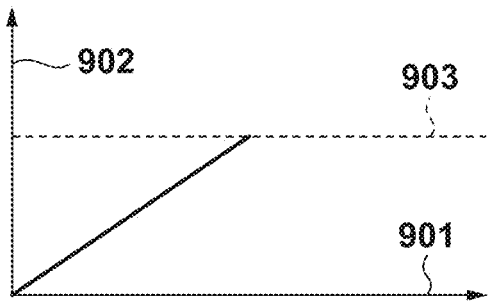
FIGS. 9A to 9D are diagrams pertaining to the relationship between time and a focus position movement amount.

FIGS. 9A to 9D are diagrams pertaining to the relationship between time and a focus position movement amount. FIG. 9A is a diagram illustrating a case where time is proportional to the focus position movement amount. A horizontal axis 901 represents time, a vertical axis 902 represents the focus position movement amount, and a broken line 903 represents the focus position movement amount corresponding to the position where the selected object is in focus. FIG. 9A corresponds to a case where the selected object has been brought into focus by operating the focus ring 7 at a constant speed, a case where the selected object has been brought into focus through autofocus, or the like.

Figure 9B:
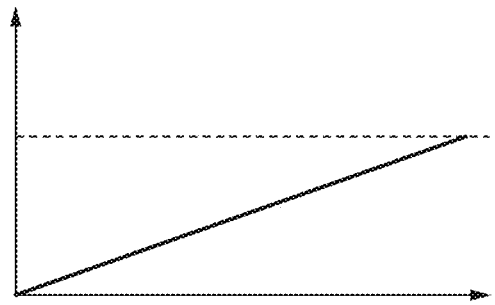

FIG. 9B is a diagram illustrating a case where time is proportional to the focus position movement amount. Compared to FIG. 9A, in FIG. 9B, the in-focus position is moved over a longer period of time. FIG. 9B corresponds to a case where the selected object has been brought into focus by slowly operating the focus ring 7 at a constant speed, a case where the selected object has been brought into focus slowly through autofocus, or the like.

Figure 9C:
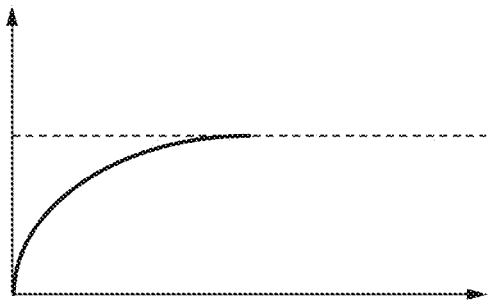

FIG. 9C is a diagram illustrating a case where time is not proportional to the focus position movement amount. The focus position moves quickly to a position where the selected object is almost in focus, and then moves slowly to the position where the selected object is in focus.

Figure 9D:
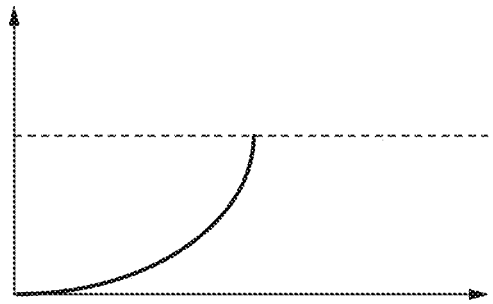

FIG. 9D is a diagram illustrating a case where time is not proportional to the focus position movement amount. The focus position initially moves slowly to a position where the selected object is almost in focus, and then moves quickly to the position where the selected object is in focus.

When shooting a moving image, blurring object or the background by moving the in-focus position is one method of expression, and as such, manual focus is sometimes used so that the user can adjust the in-focus position freely. However, it is not easy for the user to stop the focus position at a specific focus position accurately (e.g., a position where the selected object is in focus) when focusing manually.

Figure 10A:
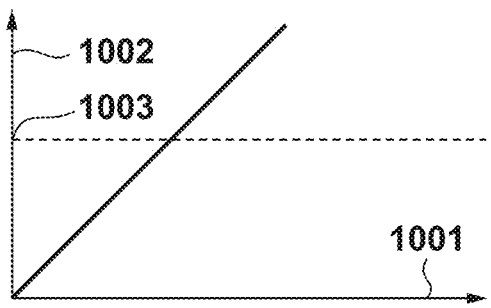
FIGS. 10A to 10E are diagrams pertaining to the relationship between an operation amount of the focus ring 7 and the focus position movement amount.

FIGS. 10A to 10E are diagrams pertaining to a relationship between the operation amount of the focus ring 7 and the focus position movement amount. FIG. 10A is a diagram illustrating a case where the operation amount of the focus ring 7 is proportional to the focus position movement amount. A horizontal axis 1001 represents the operation amount of the focus ring 7, a vertical axis 1002 represents the focus position movement amount, and a broken line 1003 represents the focus position movement amount corresponding to the position where the selected object is in focus. In FIG. 10A, the focus position changes proportionally with the operation amount of the focus ring 7, even after the selected object is in focus.

Figure 10B:
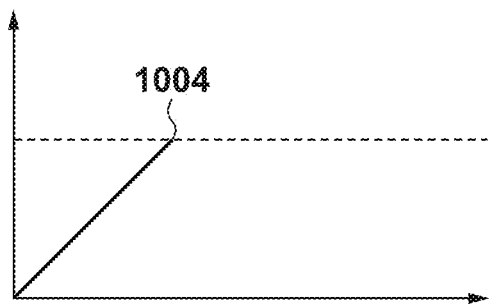

FIG. 10B is a diagram illustrating a case where, after the focus position has moved to a position where the selected object is in focus, the focus position does not move even if the focus ring 7 is operated. Although the operation amount of the focus ring 7 and the focus position movement amount are proportional until the focus position corresponding to reference sign 1004 (i.e., the position where the selected object is in focus), after the selected object is in focus, the focus position does not move even if the focus ring 7 is operated. It is therefore ease to stop the focus position at the position where the selected object is in focus, even when focusing manually.

Figure 10C:
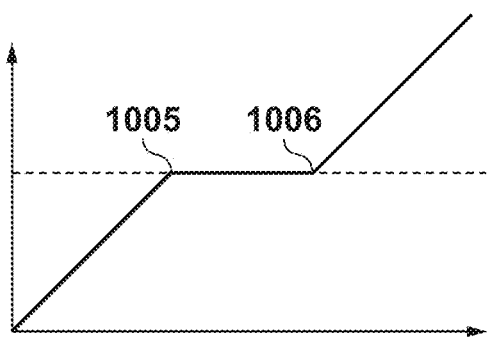

FIG. 10C is a diagram illustrating a case where, after the focus position has moved to a position where the selected object is in focus, the focus position does not move for a set period even if the focus ring 7 is operated, but then moves after the set period has passed. As with the case illustrated in FIG. 10B, the focus position stops at the position where the selected object is in focus, but the operation amount of the focus ring 7 and the focus position movement amount are proportional after the timing indicated by reference sign 1006. The focus position movement resumes in response to the focus ring 7 being operated by a predetermined amount between the timing indicated by reference sign 1005 and the timing indicated by reference sign 1006, stopping the operation of the focus ring for a predetermined amount of time at the timing indicated by reference sign 1006, or the like.

Figure 10D:
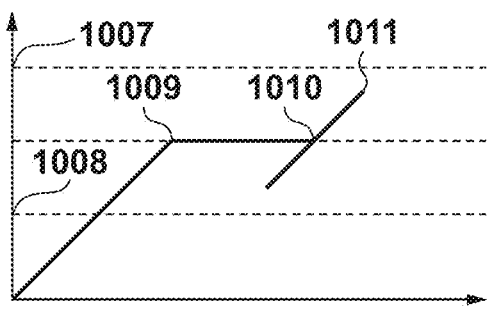

FIG. 10D is a diagram illustrating a case where, after the focus position has moved to a position where the selected object is in focus, the focus position does not move for a set period even if the focus ring 7 is operated, but then moves after the set period has passed. A broken line 1007 and a broken line 1008 indicate focus positions shifted by a predetermined amount from the focus position indicated by the broken line 1003. The process up to the timing indicated by reference sign 1010 is the same as that up to the timing indicated by reference sign 1006 in FIG. 10C. FIG. 10D illustrates a case where, after the focus position movement has been resumed, the operation of the focus ring 7 has been stopped at a position 1011 before the broken line 1007, and the focus ring 7 has been operated in the reverse direction. The operation of the focus ring 7 is not invalidated at the position where the selected object is in focus (the timing indicated by reference sign 1010), and the focus position moves in response to the focus ring 7 being operated. Because the focus position has not moved by a predetermined amount from the position where the selected object is in focus, the system control unit 50 determines that fine adjustments are being made to the focus of the selected object, and enables the focus position to be moved forward and backward from the position where the selected object is in focus.

Figure 10E:
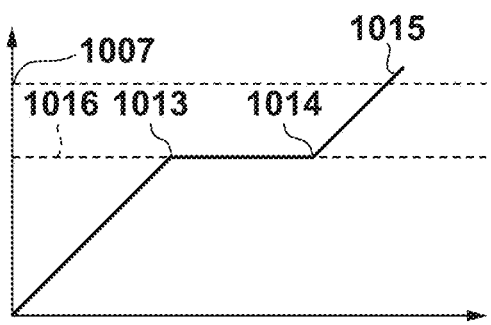

FIG. 10E is a diagram illustrating a case where, after the focus position has moved to a position where the selected object is in focus, the focus position does not move for a set period even if the focus ring 7 is operated, but then moves after the set period has passed. The process up to the timing indicated by reference sign 1014 is the same as that up to the timing indicated by reference sign 1010 in FIG. 10D. FIG. 10E illustrates a case where, after the focus position movement has been resumed, the operation of the focus ring 7 has been stopped at a position 1015 above the broken line 1007, and the focus ring 7 has been operated in the reverse direction. In this case, even if the focus ring 7 is operated further at the focus position indicated by reference sign 1014, the focus position will not move. Because the focus position has moved a predetermined amount from the position where the selected object is in focus, the system control unit 50 determines not that fine adjustments are being made to the focus of the selected object, but rather that the focus has been moved to another object, and thus ensures that the focus position does not move from the position where the selected object is in focus.

Figure 11A:
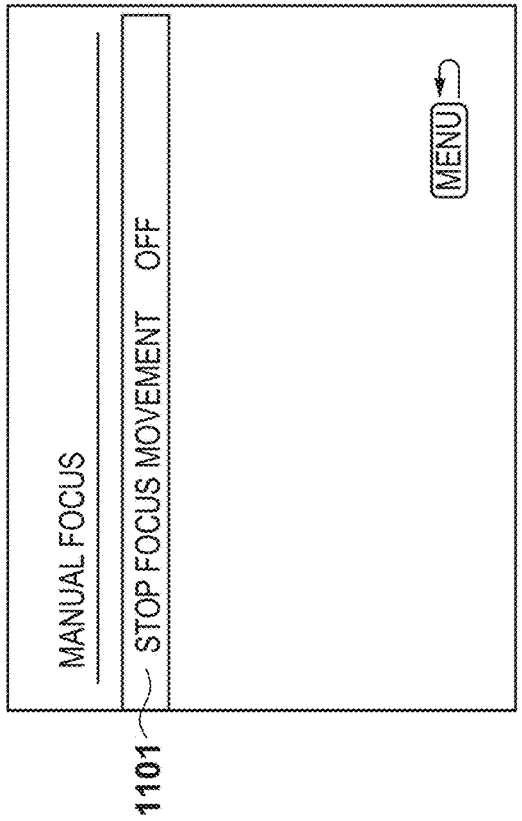
FIGS. 11A to 11D are diagrams illustrating various screens pertaining to settings for invalidating operations of the focus ring 7 at a predetermined focus position, when focusing manually.

FIGS. 11A to 11D are diagrams illustrating various screens pertaining to settings for invalidating operations of the focus ring 7 at a predetermined focus position, when focusing manually. FIG. 11A is a display screen indicating current settings. Setting 1101 indicates a setting that invalidates operations of the focus ring 7.

Figure 11B:
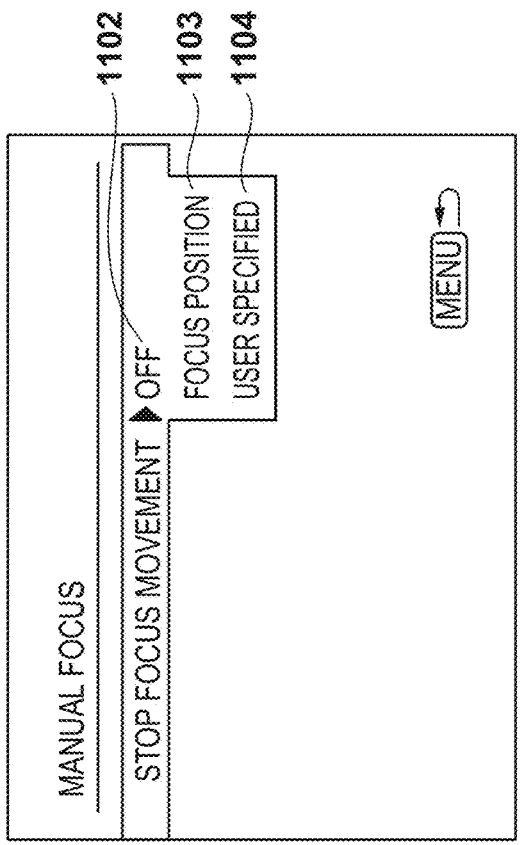

FIG. 11B is a display screen in which the settings that invalidate operations of the focus ring 7 are changed. The user can select one setting from among settings 1102, 1103, and 1104. Setting 1102 indicates a setting that does not invalidate operations of the focus ring 7. Setting 1103 indicates a setting that invalidates operations of the focus ring 7 when the focus position is at a position where an object is in focus. Setting 1104 indicates a setting that invalidates operations of the focus ring 7 when the focus position is at a position specified by the user.

Figure 11C:
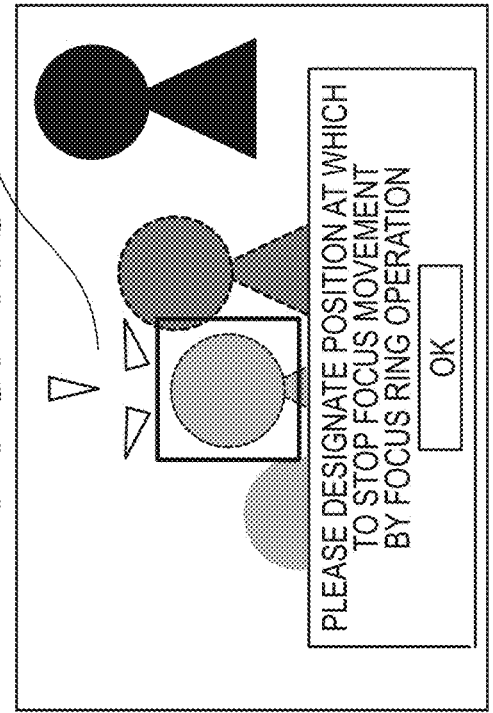

FIG. 11C illustrates a display screen through which the user designates a focus position, when the setting 1104 has been selected in FIG. 11B. A focus guide icon 1105 changes in response to the user operating the focus ring 7. The user can specify the focus position by pressing the set button 75.

Figure 11D:
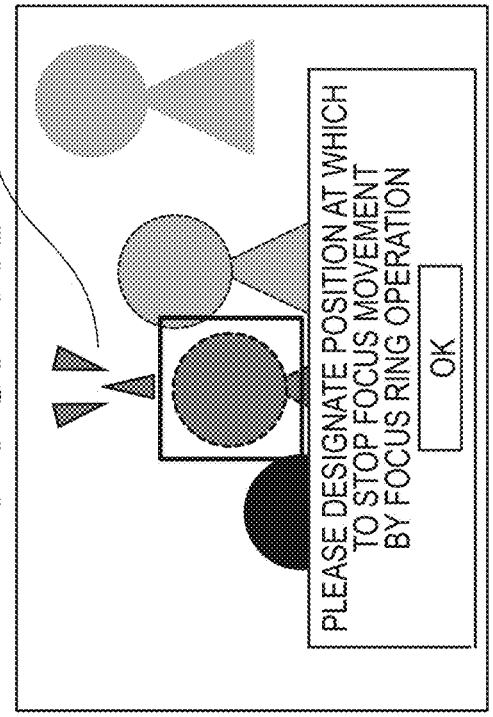

FIG. 11D is a diagram illustrating a state in which the focus guide icon 1105 has changed to a focus guide icon 1106 in response to the user operating the focus ring 7 in the state indicated in FIG. 11C.

FIG. 12 is a diagram pertaining to a process for invalidating operations of the focus ring 7 in accordance with the focus degree of the selected object, and the display of a focus guide icon at that time, when focusing manually.

A shooting screen 1201 is a screen displayed in the display unit 28 of the digital camera 100, and includes a live view image (a captured image corresponding to the shooting range). The shooting screen 1201 corresponds to a state before the focus is adjusted.

When the focus ring 7 is rotated as indicated by a focus ring rotation amount 1241, the shooting screen 1201 changes to a shooting screen 1211. The shooting screen 1211 corresponds to a state in which the focus adjustment has resulted in the focus position matching the position of the selected object. The focus degree of a selected object 1213 becomes maximum, and focus guide icons 1217, 1218, and 1219 are displayed in the same manner as the focus guide icons 427, 428, and 429 illustrated in FIG. 4.

When the focus ring 7 is rotated as indicated by a focus ring rotation amount 1242, the shooting screen 1211 changes to a shooting screen 1221. The shooting screen 1221 corresponds to a state in which the focus position has stopped at the position of the selected object. Like the selected object 1213, the focus degree is maximum for a selected object 1223. Focus guide icons 1227, 1228, and 1229 are displayed with colors indicating that the operation of the focus ring 7 has been invalidated.

When the focus ring 7 is rotated as indicated by a focus ring rotation amount 1243, the shooting screen 1221 changes to a shooting screen 1231. The shooting screen 1231 corresponds to a state in which the operation of the focus ring 7 has been temporarily stopped in the state indicated by the shooting screen 1221, and has then been resumed. The focus degree of a selected object 1233, resulting from the focus ring 7 being rotated further, is lower than that of the selected object 1223.

Figure 13A:
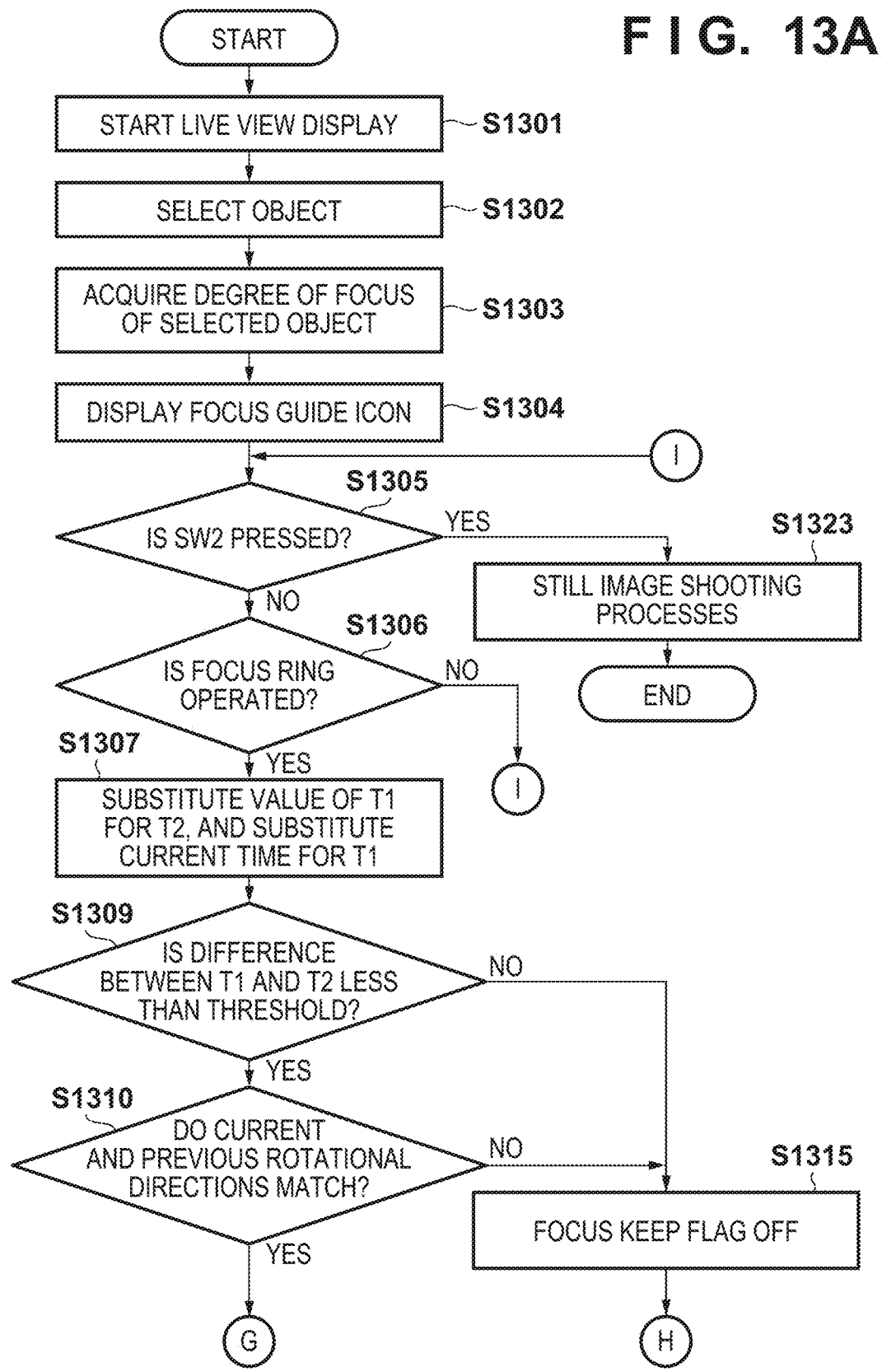
FIGS. 13A and 13B are flowcharts illustrating a shooting process according to a fourth embodiment.
Figure 13B:
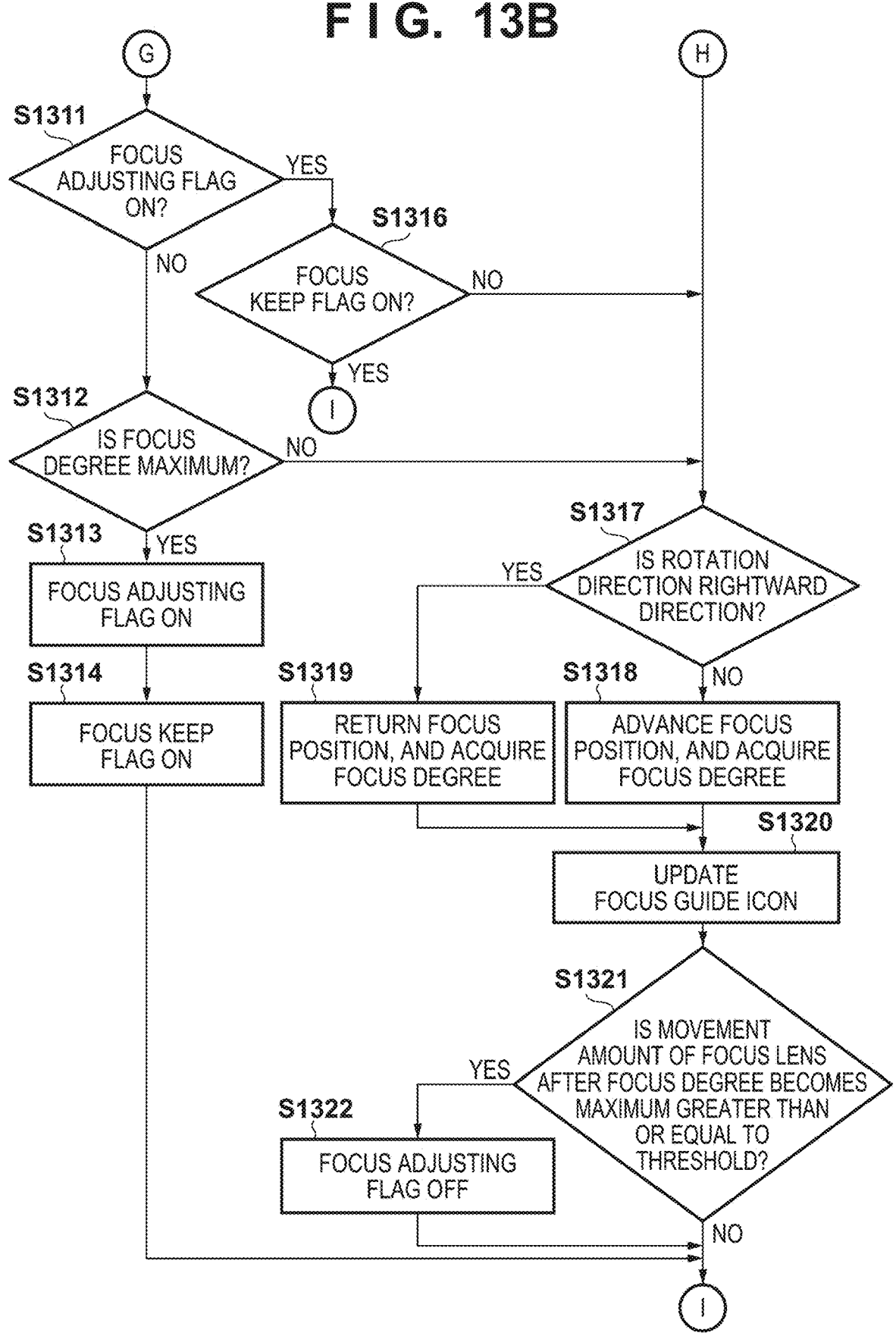

FIGS. 13A and 13B are flowcharts illustrating a shooting process according to the fourth embodiment. Unless otherwise specified, the processes in each step of these flowcharts are realized by the system control unit 50 executing programs recorded in the non-volatile memory 56 and loaded into the system memory 52.

In step S1301, the system control unit 50 starts a live view display. In step S1302, the system control unit 50 selects an object (region) to be focused on. In step S1303, the system control unit 50 acquires the focus degree of the selected object. In step S1304, the system control unit 50 displays the focus guide icon superimposed on the selected object.

In step S1305, the system control unit 50 determines whether or not the second shutter switch 64 has been pressed (whether or not SW2 has been generated). If SW2 has been generated, the process moves to step S1323. If SW2 has not been generated, the process moves to step S1306.

In step S1306, the system control unit 50 determines whether or not the focus ring 7 has been operated (i.e., whether or not the focus ring 7 has been rotated). If the focus ring 7 has been operated, the process moves to step S1307. If the focus ring 7 has not been operated, the process returns to step S1305.

In step S1307, the system control unit 50 substitutes the value of a variable T1 for a variable T2, and substitutes the current time for the variable T1. Here, the variable T1 is a variable for storing the current operation time of the focus ring 7, and the variable T2 is a variable for storing the previous operation time of the focus ring 7.

In step S1309, the system control unit 50 determines whether or not a difference between T1 and T2 is less than a threshold. If the difference between T1 and T2 is less than the threshold, the process moves to step S1310, and if not, the process moves to step S1315.

In step S1310, the system control unit 50 determines whether or not the current operation direction (rotation direction) of the focus ring 7 matches the previous operation direction. If the directions match, the process moves to step S1311, and if not, the process moves to step S1315.

The determinations of steps S1309 and S1310 are made in order to determine whether or not the operation of the focus ring 7 is being continued (whether or not the current operation of the focus ring 7 determined in step S1306 is a continuation of the previous operation). The operation of the focus ring 7 is thought to be being continued if the difference between T1 and T2 is less than the threshold, and the current and previous operation directions match.

In step S1311, the system control unit 50 determines whether or not a "focus adjusting" flag is on. The "focus adjusting" flag being on indicates that fine adjustments are being made to the focus after the focus degree has reached a maximum. If the "focus adjusting" flag is on, the process moves to step S1316. If the "focus adjusting" flag is not on, the process moves to step S1312.

In step S1312, the system control unit 50 determines whether or not the current focus degree is maximum (whether or not the selected object is in focus). If the focus degree is maximum, the process moves to step S1313. If the focus degree is not maximum, the process moves to step S1317. Note that the example of the process of step S1312 indicated in FIG. 13B corresponds to a case where the setting 1103 in FIG. 11B has been selected. If the setting 1104 has been selected, the system control unit 50 determines whether or not the current focus degree is a focus degree designated by the user, rather than determining whether or not the current focus degree is maximum.

In step S1313, the system control unit 50 sets the "focus adjusting" flag to "on". In step S1314, the system control unit 50 sets a "focus keep" flag to "on". The "focus keep" flag being on indicates that focus operations are invalid (i.e., that control is carried out so that even if the operation of the focus ring 7 is continued, the driving of the focus lens stops).

In step S1315, the system control unit 50 sets the "focus keep" flag to "off". The process of step S1315 is carried out if it is determined in step S1309 that the difference between T1 and T2 is greater than or equal to the threshold, or if it is determined in step S1310 that the current and previous operation directions of the focus ring 7 do not match. In other words, the "focus keep" flag is set to "off" if the current operation of the focus ring 7 is not a continuation of the previous operation.

In step S1316, the system control unit 50 determines whether or not the "focus keep" flag is on. If the "focus keep" flag is on, the process returns to step S1305. Control that invalidates focus operations (control that stops the driving of the focus lens even if the operation of the focus ring 7 is being continued) is realized as a result. If the "focus keep" flag is not on, the process moves to step S1317.

In step S1317, the system control unit 50 determines whether or not the rotation direction of the focus ring 7 is the rightward direction. If the direction is the rightward direction (if a first operation is being made using the focus ring 7), the process moves to step S1319. If the direction is not the rightward direction (if a second operation is being made using the focus ring 7), the process moves to step S1318.

In step S1318, the system control unit 50 drives the focus lens in the direction that advances the focus position, and acquires the focus degree. In step S1319, the system control unit 50 drives the focus lens in the direction that returns the focus position, and acquires the focus degree.

In step S1320, the system control unit 50 updates the display of the focus guide icon on the basis of the current focus degree. If the "focus keep" flag is on, the system control unit 50 displays the focus guide icons so as to indicate that the operation of the focus ring 7 has been invalidated, as indicated by the focus guide icons 1227, 1228, and 1229 in FIG. 12, for example.

In step S1321, the system control unit 50 determines whether or not the movement amount of the focus lens after the focus degree has become maximum is greater than or equal to a threshold. If the movement amount is greater than or equal to the threshold, the process moves to step S1322, and if not, the process moves to step S1305.

In step S1322, the system control unit 50 sets the "focus adjusting" flag to "off". If the "focus adjusting" flag is on, the process will not move from step S1311 to step S1312, and thus the process of step S1314 will not be executed. As such, the "focus keep" flag is not turned on even if the focus degree once again becomes maximum, and the focus operation will not be invalidated. On the other hand, if the "focus adjusting" flag is off, the "focus keep" flag will turn on and the focus operation will be invalidated if the focus degree once again becomes maximum. The control described with reference to FIGS. 10D and 10E is realized as a result. For example, consider a case where the focus degree becomes maximum while an operation for rotating the focus ring 7 in the leftward direction is being continued, and driving of the focus lens in the direction that advances the focus position has been stopped. When the operation for rotating the focus ring 7 in the leftward direction is again resumed after having been suspended, the "focus keep" flag is set to "off", and the driving of the focus lens in the direction that advances the focus position is resumed, as a result of the process carried out in step S1315. Furthermore, consider a case where the operation for rotating the focus ring 7 in the leftward direction is stopped, an operation for rotating the focus ring 7 in the rightward direction is started, and the focus degree once again becomes maximum (an example of the target focus degree) while the operation for rotating in the rightward direction is being continued. In this case, the driving of the focus lens in the direction that returns the focus position is stopped if the movement amount of the focus lens is greater than or equal to the threshold during the period from when the driving of the focus lens in the direction that advances the focus position is resumed to when the operation for rotating in the leftward direction ends. In other words, the focus operations are once again invalidated at the timing at which the focus degree once again becomes maximum. On the other hand, the driving of the focus lens in the direction that returns the focus position is continued if the movement amount of the focus lens is less than the threshold during the period from when the driving of the focus lens in the direction that advances the focus position is resumed to when the operation for rotating in the leftward direction ends. In other words, the focus operations are not invalidated at the timing at which the focus degree once again becomes maximum.

In step S1323, the system control unit 50 executes a series of still image shooting processes, from reading out signals from the image capturing unit 22 to writing image data into the recording medium 200. The processing of this flowchart then ends.

According to the fourth embodiment as described thus far, the digital camera 100 drives the focus lens in a first direction (e.g., the direction that advances the focus position) in response to a first operation being made using the focus ring 7 (e.g., an operation for rotating in the leftward direction). If the focus degree has become the target focus degree while the first operation is being carried out, the digital camera 100 stops the driving of the focus lens in the first direction, and if the first operation is suspended and then resumed after the driving has been stopped, the digital camera 100 resumes the driving of the focus lens in the first direction. This makes it easy to match the focus degree to the target focus degree, which in turn makes it easier to adjust the focus, when focusing manually.

In step S1316, the system control unit 50 may further determine whether or not the focus ring 7 continues to be operated by a predetermined operation amount even after the "focus keep" flag has been set to "on" and the driving of the focus lens has stopped. If the focus ring 7 has continued to be operated by the predetermined operation amount, the process moves to step S1315 rather than returning to step S1305. Accordingly, control is carried out for resuming the driving of the focus lens if, after the focus lens driving has stopped, the operation of the focus ring 7 is not suspended, and is instead continued for a predetermined operation amount.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-133429, filed Jul. 13, 2018 which is hereby incorporated by reference herein in its entirety.

What is claimed is:

1. A focus adjustment apparatus comprising:
a first obtainment unit configured to obtain a focus degree in a predetermined region of a shooting range; and
a driving unit configured to drive a focus lens in response to an operation unit being operated,
wherein a movement amount of the focus lens per unit of an operation amount of the operation unit during the driving is lower in a case where the focus degree is greater than a focus threshold than in a case where the focus degree is lower than the focus threshold; and
the focus threshold is higher in a case where the focus lens is moving in a direction that increases the focus degree than in a case where the focus lens is moving in a direction that reduces the focus degree.

2. The focus adjustment apparatus according to claim 1, wherein in a case where an operation speed of the operation unit is higher than a speed threshold, the movement amount of the focus lens per unit of the operation amount of the operation unit during the driving is higher than in a case where the operation speed is lower than the speed threshold and the focus degree is higher than the focus threshold, regardless of the focus degree.

3. The focus adjustment apparatus according to claim 2, wherein in a case where the operation speed of the operation unit is higher than the speed threshold, the movement amount of the focus lens per unit of the operation amount of the operation unit during the driving is equal to a movement amount in a case where the operation speed is lower than the speed threshold and the focus degree is lower than the focus threshold, regardless of the focus degree.

4. The focus adjustment apparatus according to claim 1, further comprising:
a display control unit configured to display, in a display unit, a shooting screen including a captured image corresponding to the shooting range,
wherein the display control unit changes a display format of the shooting screen in accordance with whether the focus degree is greater than or less than the focus threshold.

5. The focus adjustment apparatus according to claim 4, wherein the display control unit displays an image indicating the focus degree in the shooting screen using different colors in accordance with whether the focus degree is greater than or less than the focus threshold.

6. The focus adjustment apparatus according to claim 5, wherein the image indicating the focus degree includes a graphic in which an angle changes in accordance with the focus degree; and
the display control unit displays, in the shooting screen, an image indicating an angle of the graphic corresponding to a case where the focus degree is equal to the focus threshold.

7. The focus adjustment apparatus according to claim 6, further comprising:
a second obtainment unit configured to obtain a target focus degree in the predetermined region,
wherein in a case where the focus degree is equal to the target focus degree, the display control unit displays the graphic at an angle indicating that the predetermined region is in focus.

8. The focus adjustment apparatus according to claim 4, wherein the display control unit makes an MF peaking display in the shooting screen, using different colors in accordance with whether the focus degree is greater than or less than the focus threshold.

9. The focus adjustment apparatus according to claim 1, further comprising:
a setting unit configured to set a shooting mode,
wherein in a case where the set shooting mode is a predetermined shooting mode, the movement amount of the focus lens per unit of the operation amount of the operation unit during the driving is lower in a case where the focus degree is greater than the focus threshold than in a case where the focus degree is lower than the focus threshold.

10. An image capturing apparatus comprising:
the focus adjustment apparatus according to claim 1; and
an image capturing unit.

11. A focus adjustment method comprising:
obtaining a focus degree in a predetermined region of a shooting range; and
driving a focus lens in response to an operation unit being operated,
wherein a movement amount of the focus lens per unit of an operation amount of the operation unit during the driving is lower in a case where the focus degree is greater than a focus threshold than in a case where the focus degree is lower than the focus threshold; and
the focus threshold is higher in a case where the focus lens is moving in a direction that increases the focus degree than in a case where the focus lens is moving in a direction that reduces the focus degree.

12. A non-transitory computer-readable storage medium which stores a program for causing a computer to execute a focus adjustment method comprising:
obtaining a focus degree in a predetermined region of a shooting range; and
driving a focus lens in response to an operation unit being operated,
wherein a movement amount of the focus lens per unit of an operation amount of the operation unit during the driving is lower in a case where the focus degree is greater than a focus threshold than in a case where the focus degree is lower than the focus threshold; and
the focus threshold is higher in a case where the focus lens is moving in a direction that increases the focus degree than in a case where the focus lens is moving in a direction that reduces the focus degree.

* * * * *